(12) United States Patent
Fiore et al.

(10) Patent No.: US 7,596,419 B2
(45) Date of Patent: Sep. 29, 2009

(54) INSPECTION SYSTEM AND METHOD OF MAKING AND USING SAME

(75) Inventors: John S. Fiore, Bartlesville, OK (US);
John M. Bailey, Collinsville, OK (US);
Robert E. Bagot, Arkansas City, KS (US)

(73) Assignee: SGS North America Inc., Rutherford, NJ (US)

( * ) Notice: Subject to any disclaimer, the term of this patent is extended or adjusted under 35 U.S.C. 154(b) by 786 days.

(21) Appl. No.: 11/282,739

(22) Filed: Nov. 18, 2005

(65) Prior Publication Data

US 2006/0287900 A1 Dec. 21, 2006

Related U.S. Application Data

(60) Provisional application No. 60/687,507, filed on Jun. 3, 2005.

(51) Int. Cl.
*G06F 19/00* (2006.01)

(52) U.S. Cl. .................... 700/110; 700/182; 700/160

(58) Field of Classification Search .................. None
See application file for complete search history.

(56) References Cited

U.S. PATENT DOCUMENTS

2003/0050871 A1* 3/2003 Broughton ............. 705/28

OTHER PUBLICATIONS

Suggested PMI Field Procedures Using the NITON® XL-800 Alloy Analyzer, paragraphs 1-11, 5 pages.
Positive Material Identification Draft Rev 2, Authored by: Fixed Equipment Network Positive Material Identification Task Force, ConocoPhillips Inspection Best Practice, Oct. 2003, pp. 1-18.
A MM-Test-PMI-G, Metallic Materials Test Positive Material Identification Guide, Amoco Corporation, Sep. 1997, pp. 1 and 2.
A MM-Test-PMI-S, Metallic Materials Test Positive Material Identification Specification, Amoco Corporation, Sep. 1997, pp. 1-4.

* cited by examiner

*Primary Examiner*—Matthew C Bella
*Assistant Examiner*—Alex Liew
(74) *Attorney, Agent, or Firm*—Fish & Richardson P.C.

(57) ABSTRACT

An inspection system adapted to perform retro positive material identification of components of a multi-feature system. The inspection system comprises an electronic drawing, a positive material identification database, a field load sheet and a data logger. The electronic drawing has tagged locations identifying respective features of the multi-feature system to be read for retro positive material identification analysis. The electronic drawing has at least one unique identification code for each tagged location. The positive material identification database has component information records for respective components. Each component information record correlated to a component associated with one tagged location of the electronic drawing. The field load sheet has identification codes for respective tagged locations. The identification codes of the field load sheet are correlated to the component information records of the positive material identification database. The data logger receives identification codes for respective tagged locations from the field load sheet, and also collects material composition analysis data. The data logger communicates the identification codes and the collected material composition analysis data to the positive material identification database for populating the component information records of the positive material identification database with the material composition analysis data.

2 Claims, 15 Drawing Sheets

Positive Material Identification
Field Inspection Form

| PMI Tag Number | Spec. Material | Feature | Sub | Component | Shot Number |
|---|---|---|---|---|---|
| 34d { ‖‖‖‖‖‖‖‖‖‖‖‖‖‖‖‖ <br> 1CTU-001_P0197-E6-1-001-PIPE_1 — 44a | 9 CR-1 MO | Pipe | 1 | Pipe | 0 |
| 34e { ‖‖‖‖‖‖‖‖‖‖‖‖‖‖‖‖ <br> 2CRU-034_P0184-E4-1-034-PIPE_1 — 44b | 1-1/4 CR-1/2 MO | Pipe | 1 | Pipe | 0 |
| 34f { ‖‖‖‖‖‖‖‖‖‖‖‖‖‖‖‖ <br> 2CRU-034_P0184-E4-1-034-PIPE_2 — 44c | 1-1/4 CR-1/2 MO | Reducer | 1 | Weld | 0 |
| ‖‖‖‖‖‖‖‖‖‖‖‖‖‖‖‖ <br> 2CRU-034_P0184-E4-1-034-PIPE_2 — 44d | | | 2 | Reducer | 0 |
| ‖‖‖‖‖‖‖‖‖‖‖‖‖‖‖‖ <br> 2CRU-034_P0184-E4-1-034-PIPE_2 — 44e | | | 3 | Weld | 0 |
| 34g { ‖‖‖‖‖‖‖‖‖‖‖‖‖‖‖‖ <br> 2CRU-034_P0184-E4-1-034-PIPE_3 — 44f | 1-1/4 CR-1/2 MO | Pipe | 1 | Pipe | 0 |
| 34h { ‖‖‖‖‖‖‖‖‖‖‖‖‖‖‖‖ <br> 2CRU-034_P0184-E4-1-034-PIPE_4 — 44g | 1-1/4 CR-1/2 MO | Elbow | 1 | Weld | 0 |
| ‖‖‖‖‖‖‖‖‖‖‖‖‖‖‖‖ <br> 2CRU-034_P0184-E4-1-034-PIPE_4 — 44h | | | 2 | Ell | 0 |
| ‖‖‖‖‖‖‖‖‖‖‖‖‖‖‖‖ <br> 2CRU-034_P0184-E4-1-034-PIPE_4 — 44i | | | 3 | Weld | 0 |
| 34l { ‖‖‖‖‖‖‖‖‖‖‖‖‖‖‖‖ <br> 2CRU-034_P0184-E4-1-034-PIPE_5 — 44J | 1-1/4 CR-1/2 MO | Elbow | 1 | Weld | 0 |
| ‖‖‖‖‖‖‖‖‖‖‖‖‖‖‖‖ <br> 2CRU-034_P0184-E4-1-034-PIPE_5 — 44K | | | 2 | Ell | 0 |
| ‖‖‖‖‖‖‖‖‖‖‖‖‖‖‖‖ <br> 2CRU-034_P0184-E4-1-034-PIPE_5 — 44L | | | 3 | Weld | 0 |
| 34j { ‖‖‖‖‖‖‖‖‖‖‖‖‖‖‖‖ <br> 2CRU-034_P0184-E4-1-034-PIPE_6 — 44M | 1-1/4 CR-1/2 MO | Pipe | 1 | Pipe | 0 |

*Fig. 3A*

Positive Material Identification
Field Inspection Form — 28a

| PMI Tag Number | Spec. Material | Feature | Sub | Component | Shot Number |
|---|---|---|---|---|---|
| 34d: ‖‖‖‖‖‖‖ 1CTU-001_P0197-BS-1-001-PIPE_1 — 44a | 9 CR-1 MO | Pipe | 1 | Pipe | 3 |
| 34e: ‖‖‖‖‖‖‖ 2CRU-034_P0184-E4-1-034-PIPE_1 — 44b | 1-1/4 CR-1/2 MO | Pipe | 1 | Pipe | 3 |
| 34f: ‖‖‖‖‖‖‖ 2CRU-034_P0184-E4-1-034-PIPE_2.1 — 44c | 1-1/4 CR-1/2 MO | Reducer | 1 | Weld | 3 |
| ‖‖‖‖‖‖‖ 2CRU-034_P0184-E4-1-034-PIPE_2.2 — 44d | | | 2 | Reducer | 3 |
| ‖‖‖‖‖‖‖ 2CRU-034_P0184-E4-1-034-PIPE_2.3 — 44e | | | 3 | Weld | 3 |
| 34g: ‖‖‖‖‖‖‖ 2CRU-034_P0184-E4-1-034-PIPE_3 — 44f | 1-1/4 CR-1/2 MO | Pipe | 1 | Pipe | 0 |
| 34h: ‖‖‖‖‖‖‖ 2CRU-034_P0184-E4-1-034-PIPE_4.1 — 44g | 1-1/4 CR-1/2 MO | Elbow | 1 | Weld | 0 |
| ‖‖‖‖‖‖‖ 2CRU-034_P0184-E4-1-034-PIPE_4.2 — 44h | | | 2 | Ell | 0 |
| ‖‖‖‖‖‖‖ 2CRU-034_P0184-E4-1-034-PIPE_4.3 — 44i | | | 3 | Weld | 0 |
| 34l: ‖‖‖‖‖‖‖ 2CRU-034_P0184-E4-1-034-PIPE_5.1 — 44J | 1-1/4 CR-1/2 MO | Elbow | 1 | Weld | 3 |
| ‖‖‖‖‖‖‖ 2CRU-034_P0184-E4-1-034-PIPE_5.2 — 44K | | | 2 | Ell | 3 |
| ‖‖‖‖‖‖‖ 2CRU-034_P0184-E4-1-034-PIPE_5.3 — 44L | | | 3 | Weld | 3 |
| 34j: ‖‖‖‖‖‖‖ 2CRU-034_P0184-E4-1-034-PIPE_6 — 44M | 1-1/4 CR-1/2 MO | Pipe | 1 | Pipe | 0 |

*Fig. 3B*

Retro PNI PC Refinery Metrics

| u Unit | Pipe | | | Valves | | | F Fittings | | | Welds | | | TTotals | | |
|---|---|---|---|---|---|---|---|---|---|---|---|---|---|---|---|
| | Tested | NC | %NC | Tested | NC | %NC | Tested | NC | %NC | Tested | NC | %NC | Tested | NC | %NC |
| 2CRU | 1 | 0 | 0 | | | | 1 | 0 | 0 | 1 | 0 | 0 | 1 | 0 | 0 |
| Coker | 274 | 35 | 12.8 | 109 | 6 | 5.5 | 571 | 31 | 5.43 | 512 | 80 | 15.6 | 1466 | 152 | 10.3683 |
| 1CTU | 1559 | 142 | 9.11 | 494 | 60 | 12.1 | 3397 | 178 | 5.24 | 3233 | 199 | 6.16 | 8683 | 579 | 6.6682 |
| 1HPU | 1 | 0 | 0 | 1 | 0 | 0 | 1 | 0 | 0 | 1 | 0 | 0 | 1 | 0 | 0 |
| 2CRYO | | | | | | | | | | | | | | | |
| 2CTU | | | | | | | | | | | | | | | |
| 2ISOM | | | | | | | | | | | | | | | |
| 3CRU | | | | | | | | | | | | | | | |
| 4CTU | | | | | | | | | | | | | | | |
| 4FCC | | | | | | | | | | | | | | | |
| 4HDT | | | | | | | | | | | | | | | |
| 5FCC | | | | | | | | | | | | | | | |
| 5HDT | | | | | | | | | | | | | | | |
| 6HDT | | | | | | | | | | | | | | | |
| 7HDT | | | | | | | | | | | | | | | |
| 8HDT | | | | | | | | | | | | | | | |
| alky | | | | | | | | | | | | | | | |
| Bender | | | | | | | | | | | | | | | |
| Butamer | | | | | | | | | | | | | | | |
| CalPoly | | | | | | | | | | | | | | | |
| Co Gen 088 | | | | | | | | | | | | | | | |
| Coker Wet Gas | | | | | | | | | | | | | | | |
| FG Amine | | | | | | | | | | | | | | | |
| FGRU | | | | | | | | | | | | | | | |
| MPP 037 | | | | | | | | | | | | | | | |
| MTBE | | | | | | | | | | | | | | | |
| SatGas | | | | | | | | | | | | | | | |
| SHP | | | | | | | | | | | | | | | |
| SP Utility | | | | | | | | | | | | | | | |
| SRU | | | | | | | | | | | | | | | |
| SWS | | | | | | | | | | | | | | | |
| TOTAL | 1835 | 177 | 9.65 | 605 | 66 | 10.9 | 3970 | 209 | 5.26 | 3747 | 279 | 7.45 | 10151 | 731 | 7.20126 |

*Fig. 12A*

| Priority | TA/PTA | PMI tag | PMI tag | type | component | sub tag | ln_circ | comp_tag | Spec mat | Pass Fail | Match | Temp | RT | UT | Date | Pass Fail Standard |
|---|---|---|---|---|---|---|---|---|---|---|---|---|---|---|---|---|
|  | AOK | P0010- | P0010- | Flange | Flange | 2 | B6- | 14701013_P0010-B8_40_2 | 9 Cr | Carbon Steel | Steel |  |  |  | 01/20/2005 |  |
|  | AOK | P0010- | P0010- | Flange | Flange | 4 | B6- | 14701013_P0010-B8_37_4 | 9 Cr | 316 | 316 |  |  |  | 01/20/2005 |  |
|  | AOK | P0010- | P0010- | Weld | Weld | 5 | B6- | 14701013_P0010-B8_37_5 | 9 Cr | 316 | 316 |  |  |  | 01/20/2005 |  |
|  | RPL | P0010- | P0010- | Plug | Plug | 4 | B6- | 14701013_P0010-B8_38_4 | 9 Cr | NO MATCH | MATCH |  |  |  | 01/20/2005 | Zinc Coating |
|  |  | P0002- | P0002- | Flange | Flange | 4 | B6- | 14700201_P0002-B6_02_4 | 5 Cr | No Shot | No Shot |  |  |  | 02/02/2005 | No Access - Hot Area |
|  |  | P0002- | P0002- | Weld | Weld | 5 | B6- | 14700201_P0002-B6_02_5 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_03_1 | 5 Cr | No Shot | No Shot |  |  |  | 02/02/2005 | No Access - Hot Area |
|  |  | P0002- | P0002- | Elbow | Elbow | 2 | B6- | 14700201_P0002-B6_04_1 | 5 Cr | No Shot | No Shot |  |  |  | 02/02/2005 | No Access - Hot Area |
|  |  | P0002- | P0002- | Elbow | Ell | 2 | B6- | 14700201_P0002-B6_04_2 | 5 Cr | No Shot | No Shot |  |  |  | 02/02/2005 | No Access - Hot Area |
|  |  | P0002- | P0002- | Weld | Weld | 3 | B6- | 14700201_P0002-B6_04_3 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_05_1 | 5 Cr | No Shot | No Shot |  |  |  | 02/02/2005 | No Access - Hot Area |
|  |  | P0002- | P0002- | Weldolet | Weldolet | 1 | B6- | 14700201_P0002-B6_06_1 | 5 Cr | No Shot | No Shot |  |  |  | 02/02/2005 | No Access - Hot Area |
|  |  | P0002- | P0002- | Weldolet | Olet | 2 | B6- | 14700201_P0002-B6_06_2 | 5 Cr | No Shot | No Shot |  |  |  | 02/02/2005 | No Access - Hot Area |
|  |  | P0002- | P0002- | Weld | Weld | 3 | B6- | 14700201_P0002-B6_06_3 | 5 Cr | No Shot | No Shot |  |  |  | 02/02/2005 | No Access - Hot Area |
|  |  | P0002- | P0002- | Weld | Weld | 1 | B6- | 14700201_P0002-B6_07_1 | 5 Cr | No Shot | No Shot |  |  |  | 02/02/2005 | No Access - Hot Area |
|  |  | P0002- | P0002- | Flange | Flange | 2 | B6- | 14700201_P0002-B6_07_2 | 5 Cr | No Shot | No Shot |  |  |  | 02/02/2005 | No Access - Hot Area |
|  |  | P0002- | P0002- | Flange | Flange | 4 | B6- | 14700201_P0002-B6_07_4 | 5 Cr | No Shot | No Shot |  |  |  | 02/02/2005 | No Access - Hot Area |
|  |  | P0002- | P0002- | Weld | Weld | 5 | B6- | 14700201_P0002-B6_07_5 | 5 Cr | No Shot | No Shot |  |  |  | 02/02/2005 | No Access - Hot Area |
|  |  | P0002- | P0002- | Plug | Plug | 1 | B6- | 14700201_P0002-B6_08_1 | 5 Cr | No Shot | No Shot |  |  |  | 02/02/2005 | No Access - Hot Area |
|  |  | P0002- | P0002- | Plug | Body | 2 | B6- | 14700201_P0002-B6_08_2 | 5 Cr | No Shot | No Shot |  |  |  | 02/02/2005 | No Access - Hot Area |
|  |  | P0002- | P0002- | Plug | Weld | 3 | B6- | 14700201_P0002-B6_08_3 | 5 Cr | No Shot | No Shot |  |  |  | 02/02/2005 | No Access - Hot Area |
|  | RPL | P0002- | P0002- | Plug | Plug | 4 | B6- | 14700201_P0002-B6_09_4 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_09_1 | 5 Cr | No Shot | No Shot |  |  |  | 02/02/2005 | No Access - Hot Area |
|  |  | P0002- | P0002- | Elbow | Weld | 2 | B6- | 14700201_P0002-B6_10_1 | 5 Cr | No Shot | No Shot |  |  |  | 02/02/2005 | No Access - Hot Area |
|  |  | P0002- | P0002- | Elbow | Ell | 3 | B6- | 14700201_P0002-B6_10_2 | 5 Cr | No Shot | No Shot |  |  |  | 02/02/2005 | No Access - Hot Area |
|  |  | P0002- | P0002- | Elbow | Elbow | 3 | B6- | 14700201_P0002-B6_10_3 | 5 Cr | No Shot | No Shot |  |  |  | 02/02/2005 | No Access - Hot Area |
|  |  | P0002- | P0002- | Reducer | Reducer | 2 | B6- | 14700201_P0002-B6_11_2 | 5 Cr | No Shot | No Shot |  |  |  | 02/02/2005 | No Access - Hot Area |
|  |  | P0002- | P0002- | Reducer | Weld | 3 | B6- | 14700201_P0002-B6_11_3 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_12_1 | 5 Cr | No Shot | No Shot |  |  |  | 02/02/2005 | No Access - Hot Area |
|  |  | P0002- | P0002- | Weld | Weld | 2 | B6- | 14700201_P0002-B6_18_5 | 5 Cr | No Shot | No Shot |  |  |  | 02/02/2005 | No Access - Hot Area |
|  |  | P0002- | P0002- | Elbow | Weld | 1 | B6- | 14700201_P0002-B6_24_1 | 5 Cr | No Shot | No Shot |  |  |  | 02/02/2005 | No Access - Hot Area |
|  |  | P0002- | P0002- | Elbow | Ell | 2 | B6- | 14700201_P0002-B6_24_2 | 5 Cr | No Shot | No Shot |  |  |  | 02/02/2005 | No Access - Hot Area |
|  |  | P0002- | P0002- | Pipe | Pipe | 3 | B6- | 14700201_P0002-B6_24_3 | 5 Cr | No Shot | No Shot |  |  |  | 02/02/2005 | No Access - Hot Area |
|  |  | P0002- | P0002- | Weldolet | Weld | 1 | B6- | 14700201_P0002-B6_25_1 | 5 Cr | No Shot | No Shot |  |  |  | 02/02/2005 |  |
|  |  | P0002- | P0002- | Weldolet | Olet | 2 | B6- | 14700201_P0002-B6_26_2 | 5 Cr | No Shot | No Shot |  |  |  | 02/02/2005 | No Access - Hot Area |
|  |  | P0002- | P0002- | Weldolet | Weld | 3 | B6- | 14700201_P0002-B6_26_3 | 5 Cr | No Shot | No Shot |  |  |  | 02/02/2005 | No Access - Hot Area |
|  |  | P0002- | P0002- | Flange | Weld | 1 | B6- | 14700201_P0002-B6_27_1 | 5 Cr | No Shot | No Shot |  |  |  | 02/02/2005 | No Access - Hot Area |
|  |  | P0002- | P0002- | Flange | Flange | 2 | B6- | 14700201_P0002-B6_27_2 | 5 Cr | No Shot | No Shot |  |  |  | 02/02/2005 | No Access - Hot Area |
|  |  | P0002- | P0002- | Flange | Flange | 4 | B6- | 14700201_P0002-B6_27_4 | 5 Cr | No Shot | No Shot |  |  |  | 02/02/2005 | No Access - Hot Area |
|  |  | P0002- | P0002- | Flange | Weld | 5 | B6- | 14700201_P0002-B6_27_5 | 5 Cr | No Shot | No Shot |  |  |  | 02/02/2005 | No Access - Hot Area |
|  |  | P0002- | P0002- | Plug | Plug | 1 | B6- | 14700201_P0002-B6_28_1 | 5 Cr | No Shot | No Shot |  |  |  | 02/02/2005 | No Access - Hot Area |
|  |  | P0002- | P0002- | Plug | Body | 2 | B6- | 14700201_P0002-B6_28_2 | 5 Cr | No Shot | No Shot |  |  |  | 02/02/2005 | No Access - Hot Area |
|  |  | P0002- | P0002- | Plug | Weld | 3 | B6- | 14700201_P0002-B6_28_3 | 5 Cr | No Shot | No Shot |  |  |  | 02/02/2005 | No Access - Hot Area |
|  | RPL | P0002- | P0002- | Pipe | Plug | 4 | B6- | 14700201_P0002-B6_28_4 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_29_1 | 5 Cr | No Shot | No Shot |  |  |  | 02/02/2005 | No Access - Hot Area |
|  |  | P0002- | P0002- | Weld | Weld | 2 | B6- | 14700201_P0002-B6_30_1 | 5 Cr | No Shot | No Shot |  |  |  | 02/02/2005 | No Access - Hot Area |
|  |  | P0002- | P0002- | Elbow | Ell | 2 | B6- | 14700201_P0002-B6_30_3 | 5 Cr | No Shot | No Shot |  |  |  | 02/02/2005 | No Access - Hot Area |
|  |  | P0002- | P0002- | Elbow | Weld | 3 | B6- | 14700201_P0002-B6_31_1 | 5 Cr | No Shot | No Shot |  |  |  | 02/02/2005 | No Access - Hot Area |
|  |  | P0002- | P0002- | Flange | Weld | 1 | B6- | 14700201_P0002-B6_31_2 | 5 Cr | No Shot | No Shot |  |  |  | 02/02/2005 | No Access - Hot Area |
|  |  | P0002- | P0002- | Flange | Flange | 2 | B6- | 14700201_P0002-B6_32_2 | 5 Cr | No Shot | No Shot |  |  |  | 02/02/2005 | No Access - Hot Area |
|  |  | P0002- | P0002- | Flange | Flange | 4 | B6- | 14700201_P0002-B6_32_4 | 5 Cr | No Shot | No Shot |  |  |  | 02/02/2005 | No Access - Hot Area |
|  |  | P0002- | P0002- | Flange | Weld | 5 | B6- | 14700201_P0002-B6_33_5 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_33_1 | 5 Cr | No Shot | No Shot |  |  |  | 02/02/2005 | No Access - Hot Area |
|  |  | P0002- | P0002- | Pipe | Pipe | 1 | B6- | 14700201_P0002-B6_34_1 | 5 Cr | No Shot | No Shot |  |  |  | 02/02/2005 | No Access - Hot Area |

*Fig. 12B*

PMI Shot Discrepencies
CS in Alloy Services

| Unit | PMI_tag | component | Spec_matl | Date | Matcm1 | Cr | Mn | Fe | Co | Ni | Cu | Zn | Mo | pmi_id |
|---|---|---|---|---|---|---|---|---|---|---|---|---|---|---|
| 0001 | 1CTU-063_P0217-B6-1-083_8 | Ell | 5 Cr | 06/10/2004 | Carbon Steel | ND | ND | 100 | ND | ND | ND | ND | ND | 225 |
| 0001 | 1CTU-003_P0217-B6-1-083_11 | Ell | 5 Cr | 06/10/2004 | Carbon Steel | ND | ND | 87.8 | ND | ND | 12.2 | ND | ND | 237 |
| 0001 | 1CTU-115_P0436-B6-1S-115_8 | Ell | 5 Cr | 06/14/2004 | Carbon Steel | ND | ND | 100 | ND | ND | ND | ND | ND | 1611 |
| 0001 | 1CTU-121_P0465-B6-1-121_2 | Ell | 5 Cr | 06/29/2004 | Carbon Steel | ND | 1.28 | 98.72 | ND | ND | ND | ND | ND | 7049 |
| 0001 | 1CTU-121_P0465-B6-1-121_4 | Ell | 5 Cr | 06/29/2004 | Carbon Steel | ND | 0.87 | 99.13 | ND | ND | ND | ND | ND | 7053 |
| 0001 | 1CTU-100_P0594-B6-100_1 | Flange | 5 Cr | 06/01/2004 | Carbon Steel | ND | 1.27 | 98.73 | ND | ND | ND | ND | ND | 1096 |
| 0001 | 1CTU-100_P0594-B6-100_5 | Flange | 5 Cr | 06/01/2004 | Carbon Steel | ND | 2.52 | 97.48 | ND | ND | ND | ND | ND | 1121 |
| 0001 | 1CTU-121_P0437-B6-1-121_31 | Flange | 5 Cr | 06/22/2004 | Carbon Steel | ND | ND | 100 | ND | ND | ND | ND | ND | 3959 |
| 0001 | 1CTU-121_P0437-B6-1-121_12 | Flange | 5 Cr | 06/22/2004 | Carbon Steel | ND | 3.78 | 94.78 | ND | ND | ND | ND | ND | 3913 |
| 0001 | 1CTU-121_P0465-B6-1-121_3 | Pipe | 5 Cr | 06/29/2004 | Carbon Steel | ND | 1.26 | 96.63 | 1.31 | ND | ND | ND | ND | 7051 |
| 0001 | 1CTU-121_P0465-B6-1-121_5 | Pipe | 5 Cc | 06/29/2004 | Carbon Steel | ND | 1.17 | 98.83 | ND | ND | ND | ND | ND | 7055 |
| 0001 | 1CTU-100_P0594-B6-100_8 | Plug | 5 Cr | 05/28/2004 | Carbon Steel | ND | 1.75 | 98.25 | ND | ND | ND | ND | ND | 1138 |
| 0001 | 1CTU-115_P0436-B6-1S-115_20 | Plug | 5 Cr | 09/15/2004 | Carbon Steel | ND | 1.23 | 97.6 | ND | ND | ND | 1.12 | ND | 1654 |
| 0001 | 1CTU-100_P0436-B6-1-100_2 | Plug | 5 Cr | 06/01/2004 | Carbon Steel | ND | 6.2 | 93.8 | ND | ND | ND | ND | ND | 1077 |
| 0001 | 1CTU-063_P0193-B6-1-083_3 | Plug | 5 Cr | 06/10/2004 | Carbon Steel | ND | 0.72 | 94.67 | ND | ND | 1.04 | 3.57 | ND | 277 |
| 0001 | 1CTU-044_P0067-B6-1-044_7 | Plug | 5 Cr | 07/01/2004 | Carbon Steel | ND | 2.37 | 97.63 | ND | ND | ND | ND | ND | 6869 |
| 0001 | 1CTU-121_P0433-B6-1-121_31 | Reducer | 5 Cr | 06/22/2004 | Carbon Steel | ND | ND | 87.2 | ND | ND | 12.8 | ND | ND | 3961 |
| 0001 | 1CTU-100_P0594-B6-100_1' | Valve | 5 Cr | 06/01/2004 | Carbon Steel | ND | 1.35 | 98.65 | ND | ND | ND | ND | ND | 1094 |
| 0001 | 1CTU-100_P0594-B6-100_5 | Valve | 5 Cr | 06/01/2004 | Carbon Steel | ND | 1.47 | 98.53 | ND | ND | ND | ND | ND | 1119 |
| 0001 | 1CTU-121_P0437-B6-1-121_29 | Weld | 5 Cr | 06/22/2004 | Carbon Steel | ND | ND | 93.72 | ND | ND | 6.28 | ND | ND | 3950 |
| 0001 | 1CTU-121_P0437-B6-1-121_33 | Weld | 5 Cr | 06/22/2004 | Carbon Steel | ND | ND | 89.83 | ND | ND | 10.17 | ND | ND | 3952 |
| 0001 | 1CTU-063_P0217-B6-1-083_11 | Weld | 5 Cr | 06/10/2004 | Carbon Steel | ND | ND | 100 | ND | ND | ND | ND | ND | 3960 |
| 0001 | 1CTU-063_P0217-B6-1-083_11 | Weld | 5 Cr | 06/10/2004 | Carbon Steel | ND | ND | 92.95 | ND | ND | 7.05 | ND | ND | 236 |
| 0001 | 1CTU-121_P0437-B6-1-121_12 | Weld | 5 Cr | 06/22/2004 | Carbon Steel | ND | ND | 89.54 | ND | ND | 10.46 | ND | ND | 238 |
| 0001 | 1CTU-121_P0437-B6-1-121_19 | Weld | 5 Cr | 06/22/2004 | Carbon Steel | ND | 3.99 | 94.3 | ND | ND | ND | ND | ND | 3914 |
| 0001 | 1CTU-121_P0465-B6-1-121_4 | Weld | 5 Cr | 06/29/2004 | Carbon Steel | ND | ND | 100 | ND | ND | ND | ND | ND | 3931 |
| 0001 | 1CTU-95A_P0566-B6-1-095A_23 | Ell | 9 Cr | 05/24/2004 | Carbon Steel | ND | 1.7 | 98.3 | ND | ND | ND | ND | ND | 7052 |
| 0001 | 1CTU-112_P0291-B8-1-112_19 | Ell | 9 Cr | 06/01/2004 | Carbon Steel | ND | 1.33 | 98.67 | ND | ND | ND | ND | ND | 12721 |
| 0001 | 1CTU-083_P1001-B8-1-083_46 | Ell | 9 Cr | 06/07/2004 | Carbon Steel | ND | 1.55 | 98.45 | ND | ND | ND | ND | ND | 634 |
| 0001 | 1CTU-116_P0578-B8-1-116_9 | Ell | 9 Cr | 06/03/2004 | Carbon Steel | ND | ND | 100 | ND | ND | ND | ND | ND | 29206 |
| 0001 | 1CTU-083_P1002-B8-1-083_42 | Ell | 9 Cr | 06/07/2004 | Carbon Steel | ND | 1.54 | 98.46 | ND | ND | ND | ND | ND | 943 |
| 0001 | 1CTU-129_P0294-B8-1S-129_36 | Ell | 9 Cr | 08/22/2004 | Carbon Steel | ND | ND | 100 | ND | ND | ND | ND | ND | 29209 |
| 0001 | 1CTU-95_P0553-A8-1-095_20 | Flange | 9 Cr | 05/17/2004 | Carbon Steel | ND | 1.04 | 98.95 | ND | ND | ND | ND | ND | 6141 |
| 0001 | 1CTU-95_P0553-A8-1-095_13 | Flange | 9 Cr | 05/17/2004 | Carbon Steel | ND | 0.99 | 99.01 | ND | ND | ND | ND | ND | 2140 |
| 0001 | 1CTU-95A_P0790-A6-1-095A_12 | Flange | 9 Cr | 05/25/2004 | Carbon Steel | ND | ND | 95.15 | ND | ND | 4.85 | ND | ND | 2111 |
| 0001 | 1CTU-95A_P0789-B6-1-095A_19 | Flange | 9 Cr | 05/24/2004 | Carbon Steel | ND | 1.38 | 95.95 | ND | ND | ND | 2.67 | ND | 12833 |
| 0001 | 1CTU-95A_P0789-B6-1-095A_19 | Flange | 9 Cr | 05/24/2004 | Carbon Steel | ND | 1.48 | 94.65 | ND | ND | 0.07 | 3.00 | ND | 12903 |
| 0001 | 1CTU-95A_P0666-B6-1-095A_11 | Flange | 9 Cr | 05/24/2004 | Carbon Steel | ND | 1.32 | 96.69 | ND | ND | 0.77 | ND | ND | 12905 |
| 0001 | 1CTU-094_P0556-B8-094_08 | Flange | 9 Cr | 05/26/2004 | Carbon Steel | ND | 0.71 | 99.29 | ND | ND | ND | ND | ND | 12650 |
| 0001 | 1CTU-083_P1001-B8-1-083_39 | Flange | 9 Cr | 06/07/2004 | Carbon Steel | ND | 1.18 | 98.82 | ND | ND | ND | ND | ND | 29216 |
| 0001 | 1CTU-083_P1002-B8-1-083_30 | Flange | 9 Cr | 06/07/2004 | Carbon Steel | ND | 1.03 | 98.97 | ND | ND | ND | ND | ND | 449 |
| 0001 | 1CTU-95A_P0756-A6-1-095A_12 | Nut | 9 Cr | 05/25/2004 | Carbon Steel | ND | 2.75 | 97.25 | ND | ND | ND | ND | ND | 564 |
| 0001 | 1CTU-95A_P0789-B8-1-095A_19 | Nut | 9 Cr | 05/24/2004 | Carbon Steel | ND | 1.43 | 94.72 | ND | ND | ND | 3.85 | ND | 12904 |
| 0001 | 1CTU-95A_P0790-A8-1-095A_21 | Pipe | 9 Cr | 05/25/2004 | Carbon Steel | ND | 2.34 | 97.66 | ND | ND | ND | ND | ND | 12863 |
| 0001 | 1CTU-95A_P0790-A6-1-095A_11 | Pipe | 9 Cr | 05/25/2004 | Carbon Steel | ND | 1.38 | 98.62 | ND | ND | ND | ND | ND | 12829 |
| 0001 | 1CTU-95A_P0790-A8-1-095A_9 | Pipe | 9 Cr | 05/25/2004 | Carbon Steel | ND | 2.13 | 97.87 | ND | ND | ND | ND | ND | 12824 |

INSPECTION SYSTEM AND METHOD OF MAKING AND USING SAME

CROSS-REFERENCE TO RELATED APPLICATION

The present patent application claims priority to the provisional patent application identified by U.S. Ser. No. 60/687,507, filed Jun. 3, 2005; the entire content of which is hereby expressly incorporated herein by reference.

STATEMENT REGARDING FEDERALLY SPONSORED RESEARCH AND DEVELOPMENT

Not applicable.

SUMMARY OF THE INVENTION

The present invention is related to an inspection system adapted to perform retro positive material identification of components of a multi-feature system. The multi-feature system can include piping systems, vessels, equipment, or any other system that has specific alloys of construction. The inspection system can be used with any system in refineries, gas plants or manufacturing facility, or the like where it is critical or even preferable to have specific materials of construction. The inspection system comprises an electronic drawing, a positive material identification database, a field load sheet and a data logger.

The electronic drawing has tagged locations identifying respective features of the multi-feature system to be read for retro positive material identification analysis. The electronic drawing has at least one unique identification code for each tagged location.

The positive material identification database has component information records for respective components. Each component information record is correlated to a component associated with one tagged location of the electronic drawing. The field load sheet has identification codes for respective tagged locations. The identification codes of the field load sheet are correlated to the component information records of the positive material identification database.

The data logger receives identification codes for respective tagged locations from the field load sheet, and also collects material composition analysis data. The data logger communicates the identification codes and the collected material composition analysis data to the positive material identification database for populating the component information records of the positive material identification database with the material composition analysis data.

In use, an inspection company or inspector analyzes the multi-feature system to locate all locations where readings of the system should be taken. The actual features and components in the refinery, for example, may be inspected to identify all locations where shots are to be taken. Then, to prepare the inspector for the retro PMI project, locations in an electronic drawing of the actual features and components are tagged with each tagged location identifying one or more components of the multi-feature system to be read. Information related to the tagged locations is entered into a positive material identification database, which is then utilized to prepare a field package for the inspector. The field package includes one or more field load sheet(s) having at least one identification code for each tagged location. The identification codes of the field load sheet are correlated to unique identification codes of component information records of the positive material identification database. The field package also includes a representation of the electronic drawing having tags illustrating the tagged locations. The representation is preferably a print-off of the electronic drawing.

Once the inspector begins the retro PMI project, inspection data is collected as follows. An identification code is received by the inspector's data logger identifying a tagged location. Typically, the inspector's data logger is used to read a barcode (identification code) from the field load sheet. Then, material composition analysis data of at least one component identified by each tagged location is collected, typically by shooting the actual component(s) with the data logger. The unique identification code is stored with the collected material composition analysis data and then communicated to a data server for populating at least one component information record of a positive material identification database with the material composition analysis data. Reports can then be prepared by the positive material identification database once the component information records have been updated.

BRIEF DESCRIPTION OF THE SEVERAL VIEWS OF THE DRAWING

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 3a illustrates one embodiment of a field load sheet produced in accordance with the present invention.

FIG. 3b is an alternate embodiment of a field load sheet produced in accordance with the present invention.

FIG. 5 illustrates a screenshot from a user computer showing the starting of a positive material identification program and the selecting of a drawing button to retrieve a list of all electronic drawings;

FIG. 6 is another screenshot from the user computer illustrating the selecting of a particular grouping of drawings;

FIG. 7 is another screen shot from the user computer illustrating the loading of one or more electronic drawings to be worked on;

FIG. 8 illustrates a screenshot from the user computer where the user is viewing one of the electronic drawings and adding a tagged location to the electronic drawing;

FIG. 9 illustrates the opening of a positive material identification tag dialog box and the selecting of a particular feature type, and the numbering and labeling of shot location components for the feature.

FIGS. 11*a-b* illustrates the adding, editing or deleting of predetermined types of features;

FIGS. 11*c-e* illustrate the modifying of particular pre-identified components of the feature types; and FIGS. 11*f-h* illustrates the utilization of the data logger reading unique identification codes, and material composition analysis data.

FIGS. 12*a-c* illustrate exemplary reports produced utilizing the inventive inspection system constructed in accordance with the present invention, in particular:

FIG. 12*a* represents an exemplary summary report illustrating the numbers and types of components from which material composition analysis data has been collected;

FIG. 12*b* represents an exemplary discrepancy reconciliation report; and

FIG. 12*c* represents a product material identification discrepancy report illustrating the values of the different types of material composition analysis data collected.

FIG. 13 illustrates an exemplary print off of an electronic drawing constructed and produced in accordance with the present invention.

DETAILED DESCRIPTION OF THE INVENTION

Figure 1:
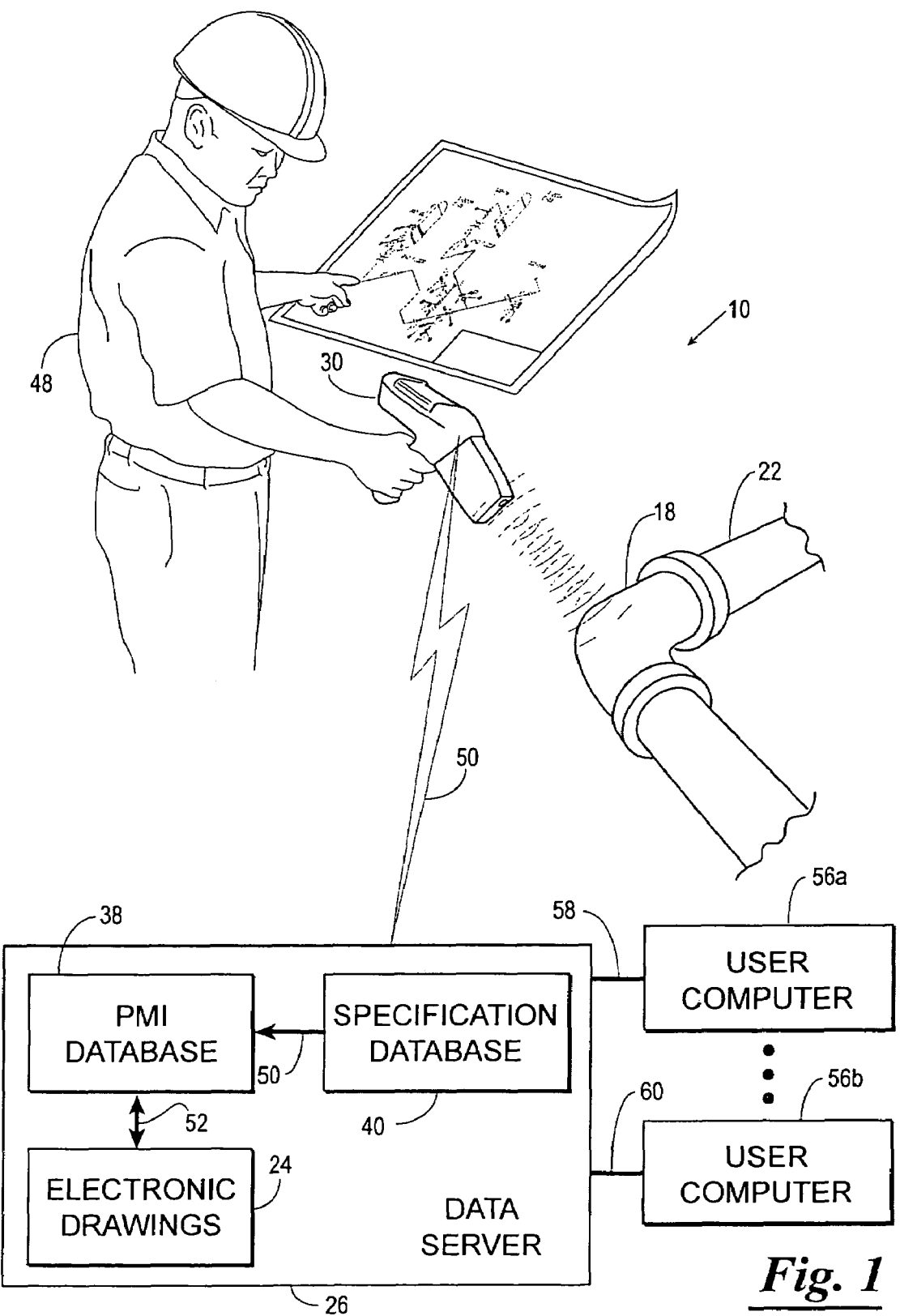
FIG. 1 is a diagrammatic view illustrating an inspection system for performing retro positive material identification of components of a multi-feature system, constructed in accordance with the present invention.

Presently preferred embodiments of the invention are shown in the above identified figures and described in detail below. In describing the preferred embodiments, like or identical reference numerals are used to identify common or similar elements. The figures are not necessarily to scale and certain features and certain views of the figures may be shown exaggerated in scale or in schematic view in the interest of clarity and conciseness.

DEFINITIONS

Certain terms are defined throughout this description as they are first used, while certain other terms used in this description are defined below:

"Component", as used herein, means a constituent part of a feature.

"Feature", as used herein, means a prominent part or characteristic of a system.

"System", as used herein, means an interdependent group of features forming a unified whole.

"Retro PMI Master Line List", as used herein, refers to a list (such as a line list) of all inspection samples within a system that is to be inspected during a retro PMI project. An example of a Retro PMI Master Line List is a listing of all alloy piping within a refinery that is to be inspected during execution of the Retro PMI Project.

"Field walk-down", as used herein refers to a field verification of all or a portion of inspection samples selected for Retro PMI inspection.

"Tagging", as used herein refers to a means of identifying a specific step(s) to be completed during a Retro PMI Project.

"Missing Shot", as used herein refers to a shot that was not identified on the Inspection Isometric when the initial PMI analyses were made and therefore was not assigned a bar code and thus was not analyzed.

"Validation Shot", as used herein means that once a shot has been taken and an analysis of a component is provided but the result is suspicious for any reason, this shot is taken again, validating that the nonconformance report is genuine.

"No-Match", as used herein, means a result where the analysis made by a data logger has not "locked in" on a known chemical analysis in an analyzer library.

DETAILED DESCRIPTION

Referring to the drawings and in particular to FIG. 1, shown therein and designated by a reference numeral 10 is an inspection system constructed in accordance with the present invention. As background, the chemical refining industry identifies alloy requirement specifications of critical systems to verify the metallurgy of features within these critical systems. Retro positive material identification inspection is accomplished on a periodic basis to identify the material composition analysis data including actual alloy compositions of the features (such as pipes and valves) within these critical systems. Then, the material composition analysis data is compared to the alloy requirements specifications to determine whether the features are within specification. This verification is performed on currently operating systems so that delinquent features and components, such as corroded pipes and welds, can be addressed as part of an upcoming outage. Certain challenges are associated with this goal as most of the systems operate at high temperatures. Moreover, the voluminous amounts of data generated during these inspections have been difficult to efficiently collect and organize. The inspection system 10 is designed to more efficiently collect and organize the large amounts of data associated with retro PMI projects.

The inspection system 10 is adapted for performing retro positive material identification of components 14 of features 18 of a multi-feature system 22. The system 22 can be any type of interdependent group of features 18 and/or components 14 forming a unified whole. One example of the system 22 is a chemical refinery. The following description will be directed to describing how the inspection system 10 is utilized for conducting a retro PMI project of a refinery. However, it should be understood that the inspection system 10 can be used for performing inspections of many types of systems 22, such as piping systems, vessels, equipment, or any other system that has specific alloys of construction. The inspection system 10 can be used with any system in refineries, gas plants or manufacturing facility, or the like where it is critical or even preferable to have specific materials of construction.

The feature 18 can be any prominent part or characteristic of the system 22. In general, it is envisioned that the system 22 will be constructed of a large number of features 18. When the system 22 is the refinery, common features 18 include pipes, bleeder valves, butt welds, flange pairs, ells, plugs, reducers, tees, or checkvalve strainers for example.

The components 14 are parts of the features 18. In general, most of the features 18 will have more than one component 14. However, it should be understood that in some instances certain features 18 only have one component 14. For example, as shown in FIG. 3*a*, when the feature 18 is a pipe, then the only component 14 for that feature 18 may be the pipe. However, when the feature 18 is a reducer, for example, then the feature 18 may have three components, such as a weld, a reducer, and another weld.

Referring again to FIG. 1, in general, the inspection system 10 includes one or more electronic drawings 24, one or more data servers 26, one or more field load sheets 28, and one or more data loggers 30. The data logger 30 is preferably an analyzer taking readings or analysis (shot) of the components 14.

Figure 2:
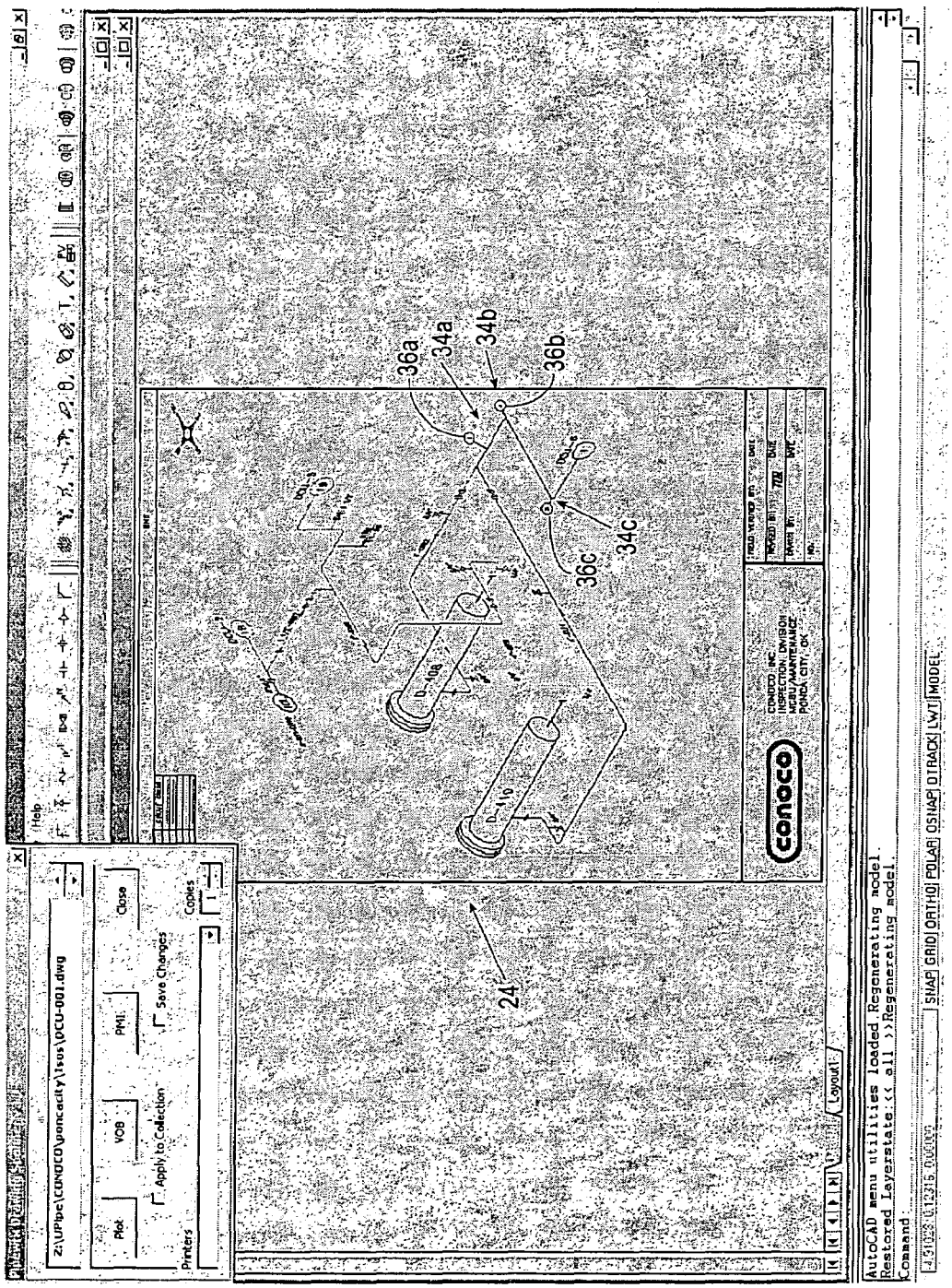
FIG. 2 is a screenshot from a user computer illustrating an electronic drawing having tagged locations.

An example of the electronic drawing 24 is shown in FIG. 2. The electronic drawing 24 is provided with one or more tagged locations 34 with each tagged location 34 identifying one or more components 14 of the multi-feature system 22 to be read for PMI analysis or retro PMI analysis. Desirably, multiple readings to be taken by the data logger 30 are grouped and identified by each tagged location 34. Instead of treating each shot independently, such shots are grouped together to be represented by a more general location on the electronic drawings 24. This prevents a cluttered drawing that has results shown for every shot taken, and thus the general locations are easily located. Once the general location and a tag number 36 (shown in FIG. 2 using the reference numerals 36l, 36b, and 36c for purposes of clarity) identifying the tagged location 34 is located, the individual shots associated with that tagged location 34 can be reviewed on a printed report or directly queried from a positive material identification database 38 (FIG. 1) by clicking on the tag number 36 or the component 14, for example. Since material discrepancies are typically less than 5% of the results, discrepancy reports can be generated with the few general tagged locations 34 highlighted.

In the example shown in FIG. 2, the electronic drawing 24 is provided with three tagged locations 34, which are designated in particular by way of the reference numerals 34a, 34b, and 34c for purposes of clarity. The electronic drawing 24 has at least one unique identification code for each tagged location 34 embedded in the electronic drawing 24. The unique identification codes for each tagged location 34 in the electronic drawing 24 will be described in more detail below. The electronic drawing 24 can be a computer aided design (CAD) drawing developed via computer aided design software, such as software packages sold under the trademarks AUTOCAD®, TURBOCAD® or the like.

To summarize how the tagged locations 34 relate to the components 14 and the features 18, it should be understood that each tagged location 34 represents a feature 18 that has one or several components 14 associated with it. Example features 18 include valves, ells, vents/bleeders, flanges, tees, and other specific features of piping systems. Each particular feature 18 has specific components 14 associated with it such as welds, flanges, bolting, and individual fittings. Individual fittings include valve bodies, unions, nipples, couplings, and many other items. As an example, a flanged valve (feature 18) includes components 14 such as a flange/pipe weld, a flange, bolting, the valve body, the valve stem, the opposite side bolting, the opposite flange, and the opposite flange/pipe weld.

Referring again to FIG. 1, the data server 26 executes the positive material identification database 38, and a specification database 40. The positive material identification database 38 has a component information record 42 (shown diagrammatically in FIG. 10) for each component 14 of the features 18 of the multi-feature system 22 to be read for retro positive material identification analysis. Each component information record 42 includes a unique identification code correlated to a component 14 of one of the features 18 of the multi-feature system 22.

The data server 26 is a system or systems embodying and/or executing the logic of the processes described herein. The logic embodied in the form of software instructions or firmware may be executed on any appropriate hardware which may be a dedicated computer system, or a personal computer system, or a distributed processing computer system, or a mainframe computer system, all of which are well understood in the art, and a detailed description of how to make or use such computer systems is not believed to be necessary herein. It should be noted that the logic for (1) executing the positive material identification database 38, (2) creating, loading, reading and/or modifying the electronic drawings 24, and (3) executing the specification database 40 as described herein may be embedded within a single computer or programmed logic system, or be implemented as separate computers or programmed logic systems, or be executed on multiple systems using any of the distributed processing models which are well understood in the art, or be implemented using any mixture of the above.

Two different examples of the field load sheet 28 are depicted in FIGS. 3a and 3b. The field load sheets 28 and 28a have at least one identification code 44, which is unique for each tagged location 34. The identification codes 44 of the field load sheets 28 and 28a are correlated with the unique identification codes of the component information records 42 of the positive material identification database 38.

For example, the field load sheet 28 depicted in FIG. 3a, includes identification codes 44a, 44b, 44c, 44d, 44e, 44f, 44g, 44h, 44i, 44j, 44k, 44l, and 44m corresponding to tagged locations 34d, 34e, 34f, 34g, 34h, 34i and 34j. Thus, the unique identification codes 44c, 44d, and 44e correspond to the one tagged locations 34f, for example. As another example, the identification code 44f (only having one component) corresponds to the tagged location 34g. Each component 14 is assigned a sub component number 45, such as 1, 2, 3, etc. The sub component number 45 cooperates with the identification code 44 to uniquely identify each component 14 on the field load sheet 28.

The field load sheets 28 and 28a also optionally include a specification material identifier 46, the feature 18, the component 14 and a shot number 47.

The field load sheet 28a shown in FIG. 3B is similar to the field load sheet 28, with the exception that each component 14 is identified uniquely by the identification code 44 by itself. Thus, using the field load sheet 28 requires the inspector 48 to enter one of the unique identification codes 44 into the data logger 30 for each component 14 prior to taking the shot of the component 14. Thus, conducting a retro PMI inspection on the feature 18 having three components 14 includes three separate scans of the identification codes 44.

The inspection system 10 is operated by an inspector 48 provided with one of the data loggers 30. The data loggers 30 are each provided with an analyzer data table updated with a new record for each "shot." Before one or more shots are taken for a tagged location 34, the data logger 30 scans or otherwise receives the identification code 44 for each tagged location 34 from the field load sheet 28. The data logger 30 then creates a new record in the data analyzer table and stores the identification code 44 in a field in the analyzer data table. The data logger 30 also "shoots" and thereby collects material composition analysis data of at least one component 14 of the feature 18 identified by each tagged location 34. The material composition analysis data is also stored within fields of the analyzer data table (or within a separate table linked to the analyzer data table). The data logger 30 communicates via a communication link 50 the identification code 44 and the collective material composition analysis data to the data server 26 for populating the component information records 42 of the positive material identification database 38 with the material composition analysis data.

As will be described in more detail below, the material composition analysis data typically includes a breakdown of the element structures of alloy compositions forming the components 14, and optionally includes an indicator of the precision of the reading for each element structure identified in the alloy composition. Examples of the element structures are titanium, iron, zinc, vanadium, chromium, nickel, cobalt, tungsten, niobium, manganese, copper and molybdenum. Examples of the indicators of precision are 0.15% or 0.88%.

It should be understood that the unique identification code of each component information record 42 only has to be correlated to one of the components 14 in the electronic drawing 24. The unique identification codes embedded in the electronic drawing 24 do not need to be the same as the unique identification codes in the positive material identification database 38. The codes merely need to be related so that the unique identification codes in the positive material identification database 38 directly imply or are linked to the respective unique identification codes for each tagged location 34 in the electronic drawing 24 so that this information is linked together. Likewise, the identification codes 44 of the field load sheets 28 and 28a are also correlated to the unique identification codes of the component information records 42 of the positive material identification database 38. Again, the identification codes 44 of the field load sheets 28 and 28a can either be identical to or different from the unique identification codes in the positive material identification database, so long as the information on the field load sheets 28 and 28a are linked to the component information records 42 in the positive material identification database 38.

The field load sheets 28 and 28a can be any device capable of providing the identification codes 44 to the data logger 30. In general, the positive material identification database 38 produces the field load sheets 28 and 28a by generating a printed report having the identification codes 44 represented as bar codes. However, it should be understood that the field load sheets 28 and 28a can be represented in other forms, such as data records loaded into the data logger 30. Further, although the identification codes 44 are depicted in FIGS. 3a and 3b as bar codes with a numerical indicator underneath, the identification codes 44 can be constructed or represented in other manners. For example, the identification codes 44 can be represented as a radiofrequency code, a magnetic ink character recognition (MICR) code, or other type of indicator which can either be manually entered into the data logger 30 by the inspector 48, for example or scanned in using a device such as a barcode reader, or a MICR reader.

Figure 9:
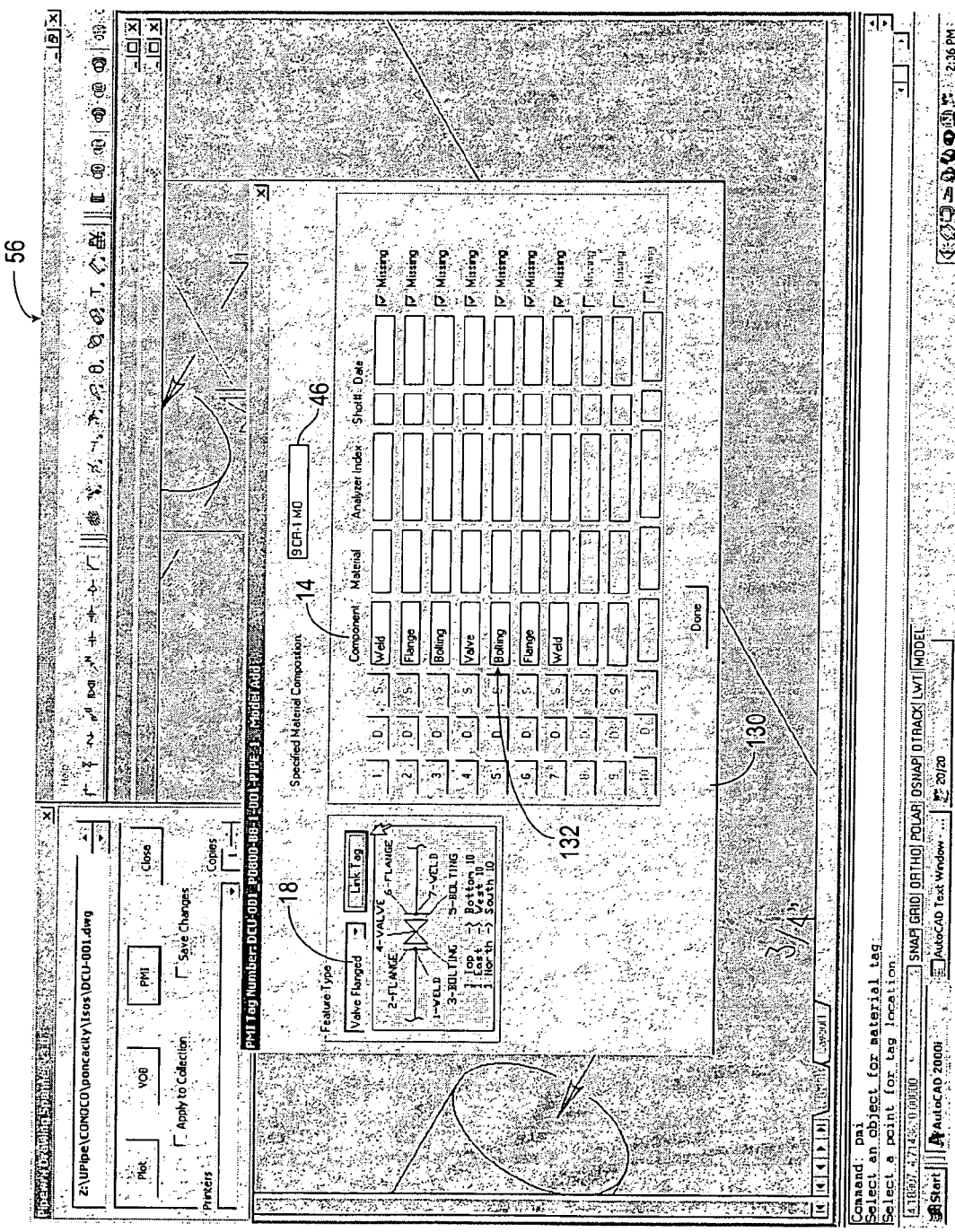

Referring again to FIG. 1, when a tagged location 34 is created, not only is the tag number 36 drawn on the electronic drawing 24, but a new record is created in the positive material information database 38 with information from the specification database 40 and user selections. That is, as shown in FIG. 9, when a location is selected to add a new tag, a window opens that prompts the user to select the type of 'Feature' that the tag points out. When the feature 18 is selected, the appropriate listing of associated components 14 is populated in the positive material identification database 38. The line associated with the new tag location is selected by this operation, and the associated information for this line in the specification database 40 is retrieved (via a communication link 50) such as specified material, operating temperature, line number, and other information. All of this critical information is stored with each component information record 42 in the positive material identification database 38. The unique identification code, typically containing the name of the drawing, a line number, and a tag number is assigned to each component information record 42 as well. This is the information that is used to link the identification code 44 scanned by the data logger 30 to a particular component information record 42 in the positive material identification database 38. One example of the specification database 40 is a database program known in the art as ULTRAPIPE® obtainable from S.O.S. Engineering Software located in Media, Pa.

The positive material identification database 38 communicates with the electronic drawing 24 via a communication link 52, and vice versa, to permit the positive material identification database 38 to make changes to the electronic drawings 24 (e.g., for reporting purposes) and to permit new records to be added to the positive material identification database 38 while a user is editing or changing the electronic drawings 24.

The positive material identification database 38, the electronic drawing 24, and the specification database 40 are accessed by one or more user computers 56. The user computers 56 are designated in FIG. 1 by way of the reference numerals 56a and 56b for purposes of clarity. The user computers 56a and 56b can be any type of computational or processing device capable of interfacing with the data server 26 and accessing one or more of the positive material identification database 38, the electronic drawings 24, or the specification database 40. For example, the user computers 56 can be personal computers, personal data assistants, cellular telephones, laptop computers, tablet computers, notebook computers, dumb terminals, X-servers, combinations thereof, or any other type of general purpose or specific purpose computer or terminal. In the preferred embodiment, the positive material identification database 38 is written in a MICROSOFT® ACCESS® database program, however, other database programs can be used. Each of the user computers 56 may be provided with copies of the database program or a run-time module so that the user computers 56a and 56b communicate with the positive material identification database 38. The user computers 56a and 56b communicate with the data server 26 via communication links 58 and 60. In one preferred embodiment, the data server 26 is implemented as a web server having an http:// address on the world wide web and is accessible to the user computers 56 via the Internet. In this instance, the data server 26 is desirably provided with login and security algorithms and can be used to provide access to customers on a subscription basis. Fees may be selectively charged or invoiced for the use of the data server 26.

Figure 4:
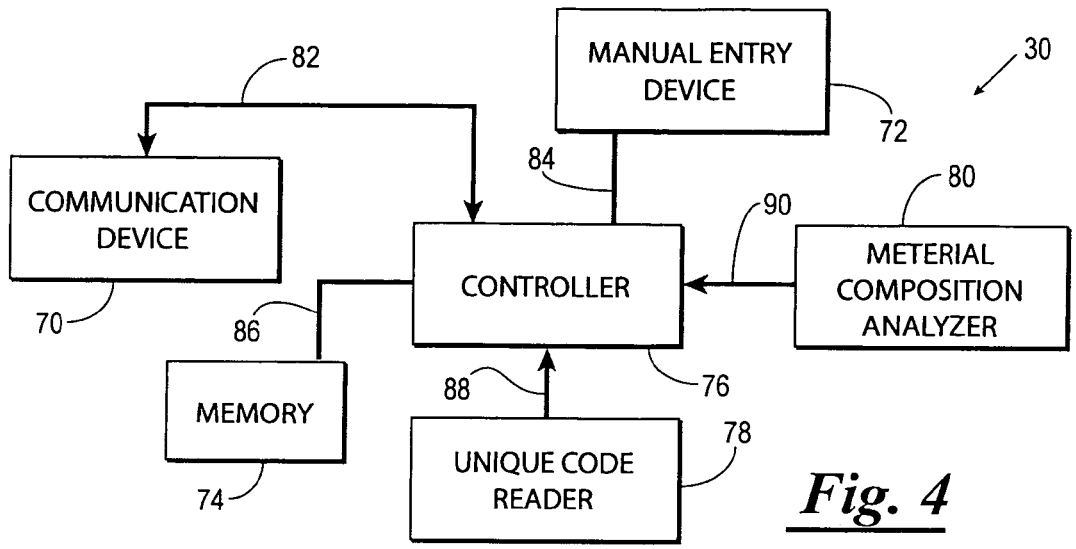
FIG. 4 illustrates a block diagram of one embodiment of a data logger in accordance with the present disclosure.

Referring to FIG. 4, shown therein is a block diagram of the data logger 30. The data logger 30 is provided with a communication device 70, a manual entry device 72, a memory 74, a controller 76, a code reader 78, and a material composition analyzer 80. The communication device 70, the manual entry device 72, the memory 74, the code reader 78, and the material composition analyzer 80 communicate with the controller 76 via the communication links 82, 84, 86, 88, and 90.

The material composition analyzer 80 is a device capable of reading element structures, or alloy compositions of the various components 14. In one preferred embodiment, the material composition analyzer 80 is a device which emits an electromagnetic field, such as x-rays or gamma rays onto the component 14, and then reads changes in frequencies reflected by the various types of alloy compositions within the component 14 to determine the element structure or alloy composition of the component 14. Once the material composition analyzer 80 reads the material composition analysis data, the material composition analysis data is transmitted to the controller 76 via the communication link 90, where the controller 76 typically stores the material composition analysis data in the memory 74 via the communication link 86.

The code reader 78 is a device capable of reading the identification code 44 of the field load sheet 28 or 28a. Thus, the construction of the code reader 78 depends on the format or type of data utilized to form the identification codes 44 on the field load sheet 28 or 28a. In one preferred embodiment, the identification codes 44 are provided on the field load sheet 28 in a barcode format. In this instance, the code reader 78 can be a barcode reader. Once the code reader 78 reads the identification code 44, the controller 76 stores the identification code 44 into the analyzer data table stored in the memory 74.

The manual entry device 72 permits the user or inspector 48 to input data into the data logger 30, modify data stored in the data logger 30, or otherwise control the data logger 30. The manual entry device 72 is a device capable of receiving input from the inspector 48, such as a keyboard, trigger, touch screen, or a microphone (in this instance the controller 76 is programmed with speech recognition software). The data received by the manual entry device 72 is forwarded to the controller 76 via the communication link 84. The controller 76 communicates with the data server 26 via the communication device 70 and the communication links 82 and 50. The data in the analyzer data table is communicated to the positive material identification database 38 in either real-time, or batch format.

In summary, each analysis (shot) taken by the material composition analyzer 80 of the data logger 30 is associated with the identification code 44 generated from the positive material identification database 38. The identification code 44 being 'read' into a field in the analyzer data table, allows a unique ID made up of any character string to be associated in the data logger 30 for each analysis. The positive material identification database 38 creates the unique code 44 that is equivalent to a unique identification code associated with a particular component of a feature tag. This association allows the analyzer data table in the data logger 30 to be immediately linked to the particular component information record 42 in the positive material identification database 38, and thus discrepancy reports can be run immediately after the material composition analysis data is uploaded to the positive material identification database 38.

FIGS. 5-9 cooperate to illustrate a method for adding tagged locations 34 to electronic drawings 24 in accordance with the present invention.

Figure 5:
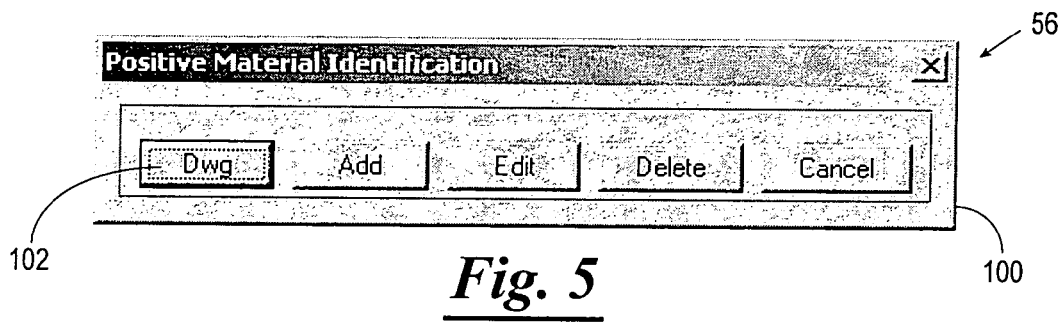
FIGS. 5-9 cooperate to illustrate a method for adding tagged locations to electronic drawings in accordance with the present invention, in particular.
Figure 6:
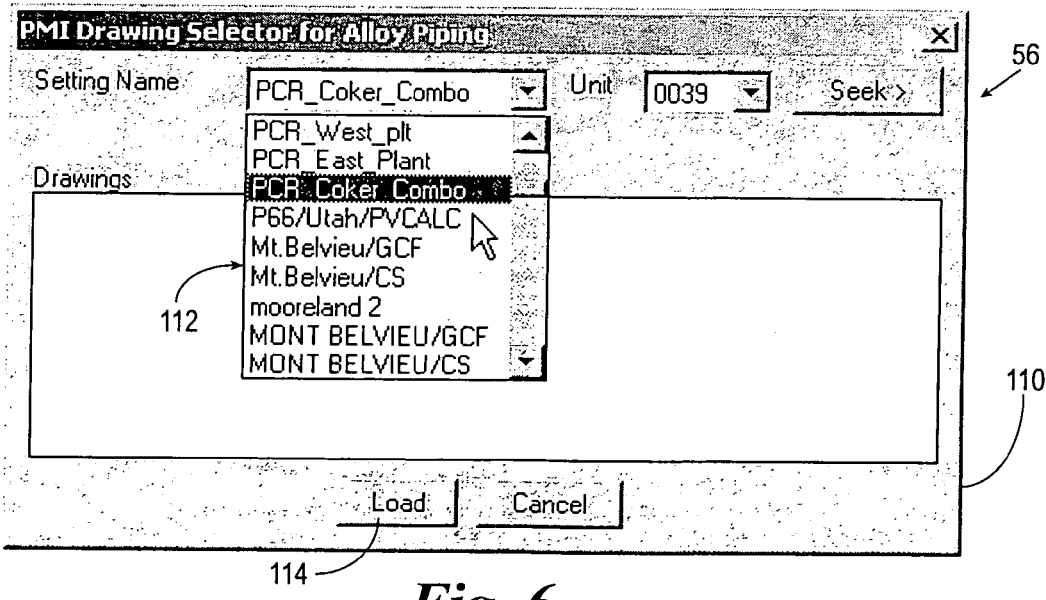
Figure 7:
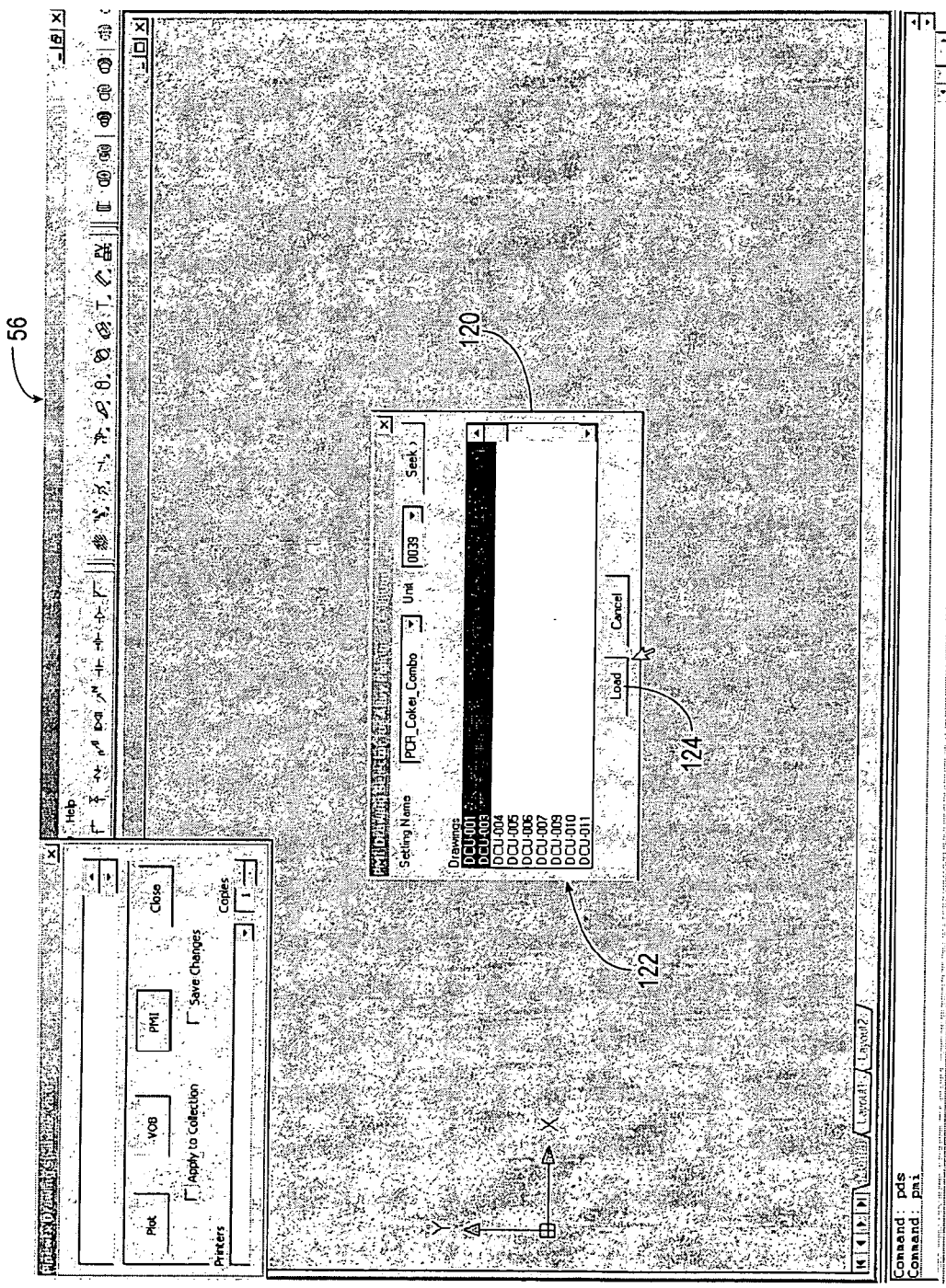

FIG. 5 illustrates a screenshot from the user computer 56 showing the starting of a positive material identification program and a window 100 having a drawing button 102. Selecting the drawing button 102 opens a window 110 having a list 112 of electronic drawings 24 sorted by group as shown in FIG. 6. The electronic drawings 24 can be grouped in any desired manner. In the example shown in FIG. 6, the electronic drawings 24 are grouped by names of different multi-feature systems 22. The user selects a desired group of drawings, and then clicks on a load button 114 to open a window 120 having a list 122 of electronic drawings 24 as shown in FIG. 7. The user selects one or all of the electronic drawings 24 to be worked on, and then selects a load button 124 to retrieve the electronic drawings 24.

Figure 8:
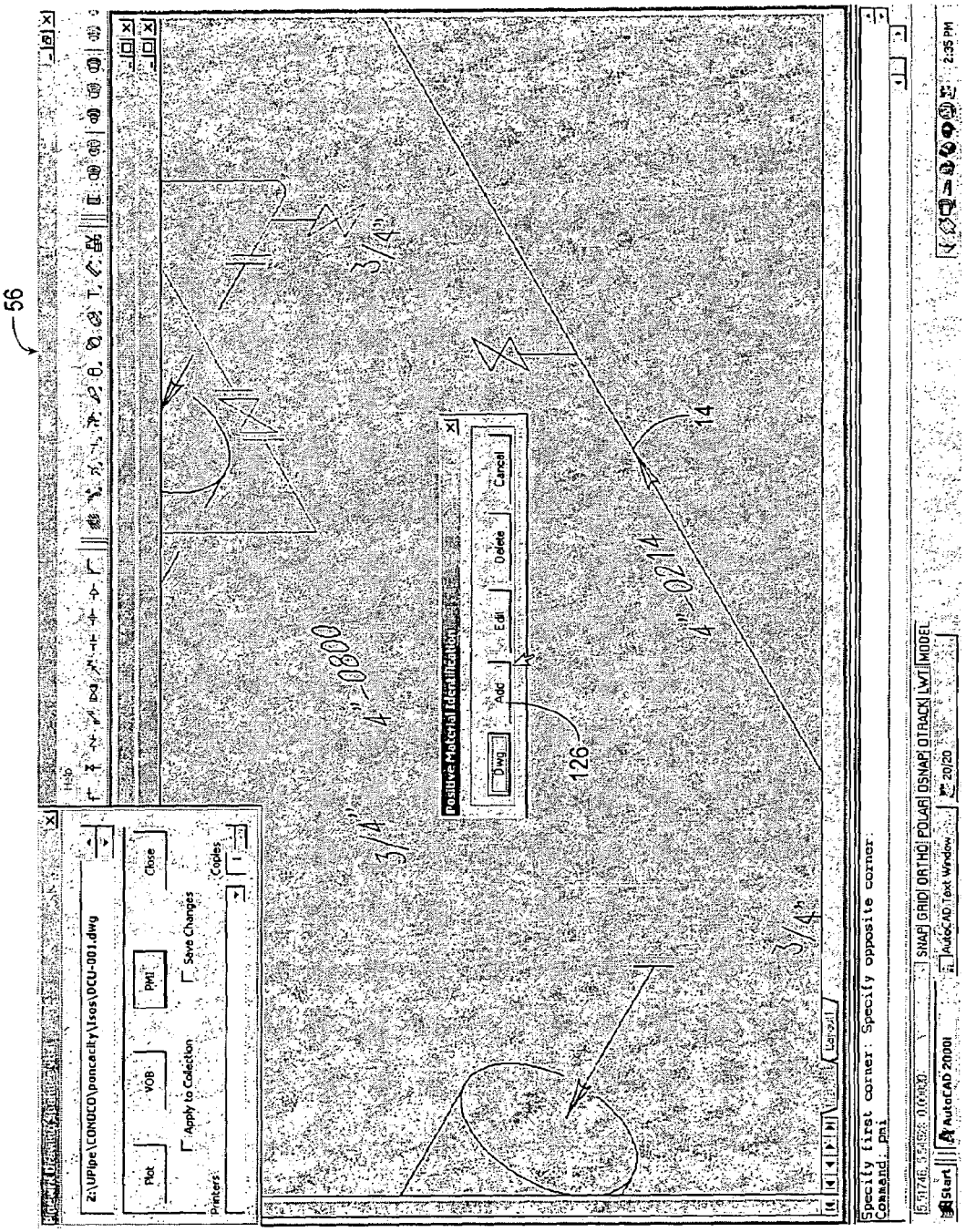

FIG. 8 illustrates a screenshot from the user computer 56 where the user is viewing one of the electronic drawings 24 and adding a tagged location 34 to the electronic drawing 24. The user scrolls through the list of electronic drawings 24 opened by the positive material identification program until the desired electronic drawing 24 is shown. The user then selects an add button 126, and then clicks on the component 14 where the tagged location 34 is to be added. The positive material identification program then creates a tag for the tagged location 34.

When a tag indicating a tagged location 34 is created, not only is a tag number 36 drawn on the electronic drawing 24, but a record is created in the positive material identification database 38 with information from the specification database 40 and user selections.

As shown in FIG. 9, when a location is selected to add a new tag, a window 130 opens that prompts the user to select the type of feature 18 that the tag points out. When the feature 18 is selected, the appropriate listing 132 of pre-defined or associated components 14 is populated in the positive material identification database 38. The line associated with the new tag location is selected by this operation, and the associated information for this line in the specification database 40 is retrieved such as specified material, operating temperature, line number, and other information. All of this information is desirably stored with each component information record 42 in the positive material identification database 38. A unique identification code, desirably containing (or based on) the drawing, line number, and tag number is assigned to each component information record 42 as well. This is the information that is used to link the identification code 44 scanned by the material composition analyzer 80 to a particular component information record 42 in the positive material identification database 38.

In addition, when a tag is created, descriptive information is imbedded in the electronic drawing 24, which can be manipulated by the positive material identification database 38. AutoCad, for example, allows additional information or attributes to be added to various lines or components of an electronic drawing 24. This information can be for an entire drawing or a selected group of drawing components such as lines, figures, circles, etc. The positive material identification database 38 modifies the descriptive information to manipulate these selected areas of the electronic drawing 24. For example, the positive material identification database 38 locates items in the database that did not meet specification, and then 'locates' the components 14 on the electronic drawings 24 for manipulations such as color changes, etc.

Figure 10A:
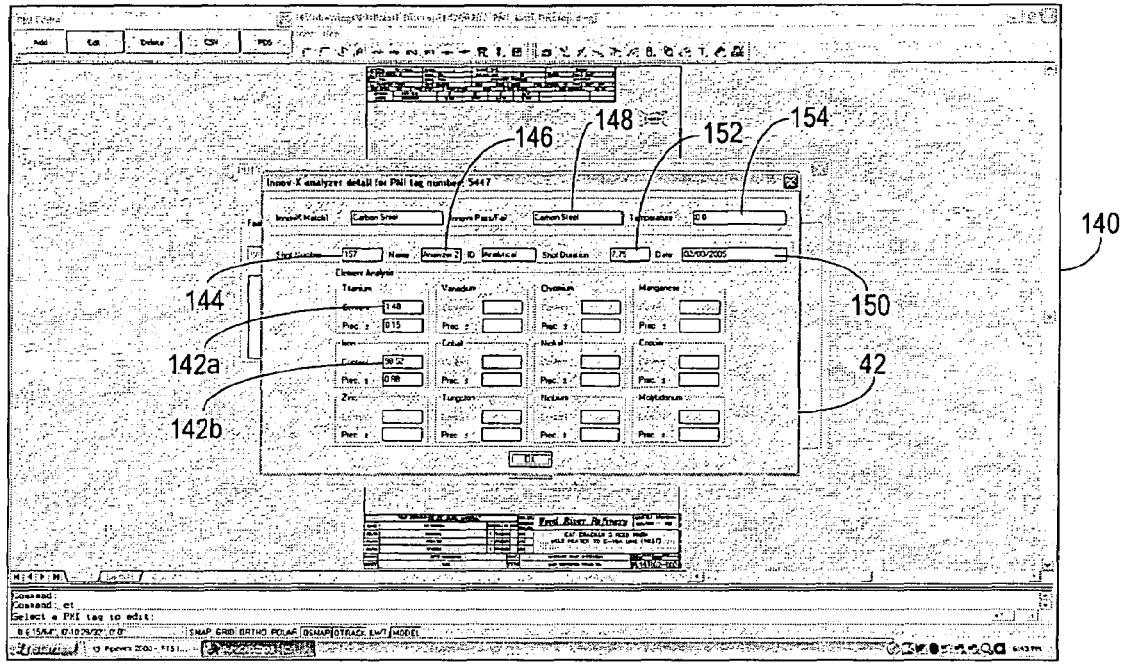
FIG. 10 is an illustration of a screenshot from the user computer showing material composition analysis data collected for at least one component.
Figure 10B:
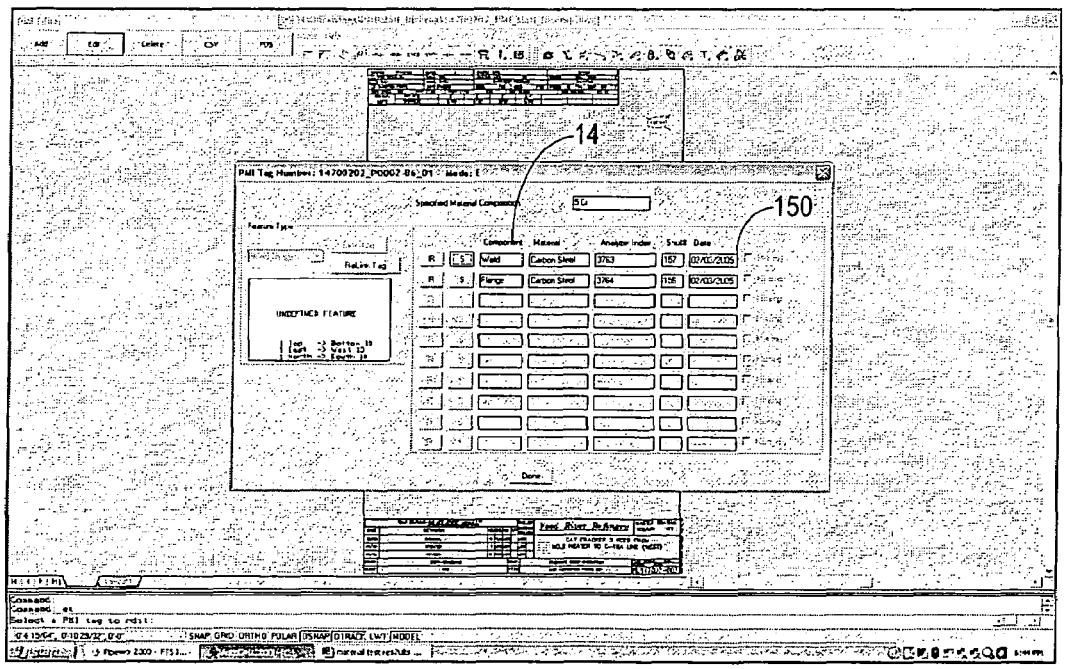

FIGS. 10A and 10B are illustrations of screenshot 140 and 140a from the user computer 56 showing material composition analysis data in a component information record 42 collected for at least one component 14. The screenshot 140a illustrates data collected from shots of respective components 14 for one feature 18 (or tag location). Thus, detailed data can be immediately retrieved for all of the components 14 associated with one feature 18 or tag location.

The material composition analysis data typically includes a breakdown of the element structures of alloy compositions forming the components 14, and optionally includes an indicator of the precision of the reading for each element structure identified in the alloy composition. Examples of the element structures are titanium, iron, zinc, vanadium, chromium, nickel, cobalt, tungsten, niobium, manganese, copper and molybdenum. Examples of the indicators of precision are 0.15% or 0.88%. The material composition analysis data is stored in element analysis fields 142 with one field for each type of element structure. Only two of the element analysis fields 142 are labeled with the reference numerals 142a and 142b for purposes of not cluttering the figure. The component information record 42 includes element fields for the following element structures: titanium, iron, zinc, vanadium, chromium, nickel, cobalt, tungsten, niobium, manganese, copper and molybdenum. It should be understood that the types of element structures can be varied, and will depend upon the types of element structures forming the components 14. The component information record 42 also contains other fields, such as shot number 144, analyzer ID 146, pass/fail 148, date 150, shot duration 152, temperature 154 or the like.

The software or logic controlling the operation of the data logger 30 will now be described. As discussed above, features 18 are routinely made up of one of more components 14. For example, testing a union (feature 18) requires getting a grade ID on 2 welds, 2 flanges, and a nut (the five components 14 of that feature 18).

Using the field load sheet 28a shown in FIG. 3B requires the inspector 48 to enter one of the identification codes 44 into the data logger 30 for each component 14 prior to taking the shot of the component 14. Thus, conducting a retro PMI inspection on the feature 18 having five components 14 requires five separate scans of the identification codes 44.

The data logger software is configured to run in either Single Test or Feature Testing Mode. The inspector 48 can switch between these modes through a menu selection. Standard mode is utilized in conjunction with the field load sheet 28a depicted in FIG. 3b, while Feature Testing Mode is used in conjunction with the field load sheet 28 depicted in FIG. 3A.

The Feature Testing Mode is described in more detail below. The field load sheet 28 shown in FIG. 3A (and the programming of the data logger 30 to be described hereinafter), on the other hand, simplifies the process of entering the identification codes 44 by only requiring one scan of the identification code 44 for each feature 18. Thus, the field load sheet 28 and the programming of the data logger 30 described hereinafter improves testing throughput and reduces operator error.

Figure 11A:
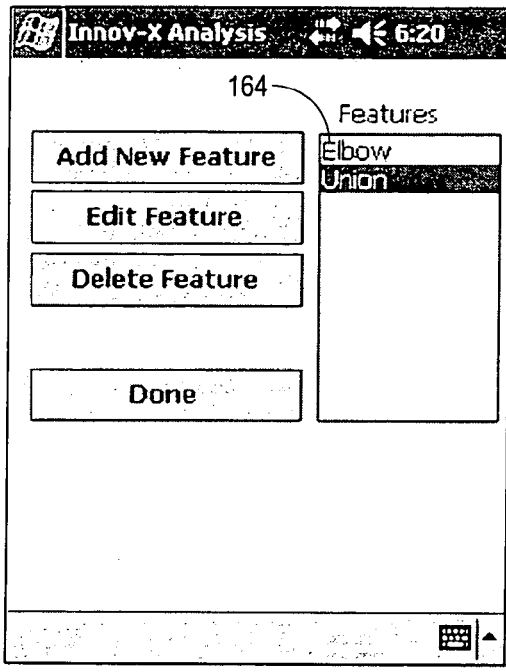
FIGS. 11*a-h* illustrates screenshots from a data logger constructed in accordance with the present invention, in particular.
Figure 11B:
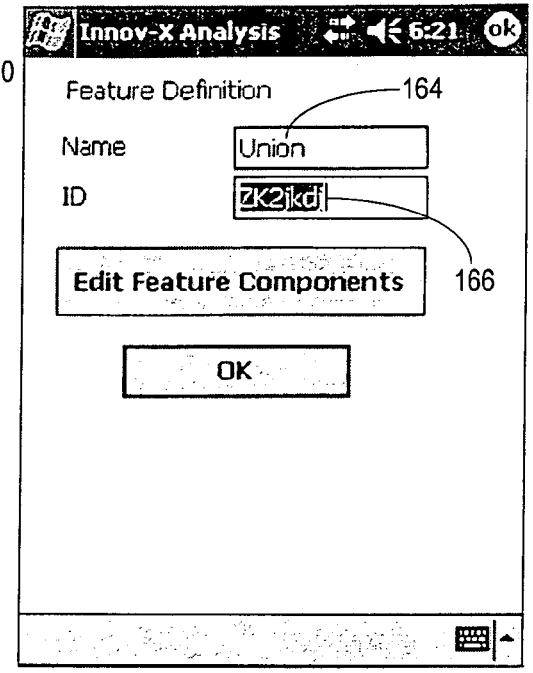

The programming of the data logger will be described hereinafter with reference to FIGS. 11a-h illustrating screenshots from the data logger 30. The data logger 30 is preferably programmed with a component/feature library. The component/feature library includes a listing of features 160, and a listing of components 162 (see FIG. 11D). Each feature 18 in the component/feature library has a unique user-readable name 164, a unique character string 166 (see FIG. 11B) and may contain other descriptive information. FIGS. 11a-b illustrate the adding, editing or deleting predetermined types of features. Components 14 are created in the component/feature library in a similar fashion. Thus, each component has a unique user-readable name and may contain other description information.

Figure 11C:
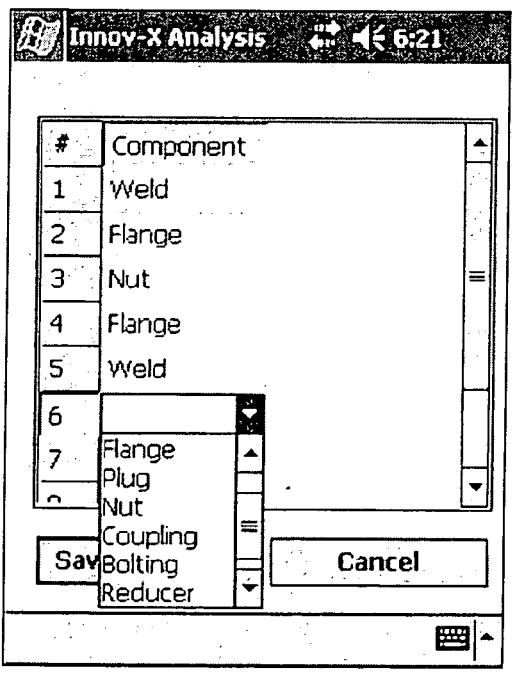
Figure 11D:
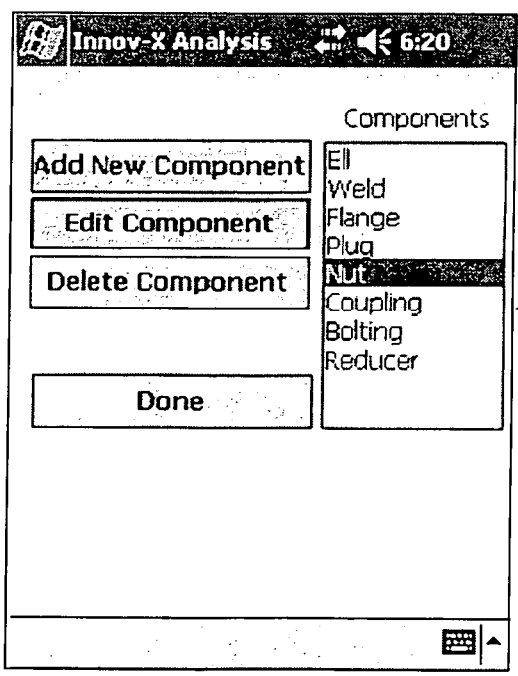
Figure 11E:
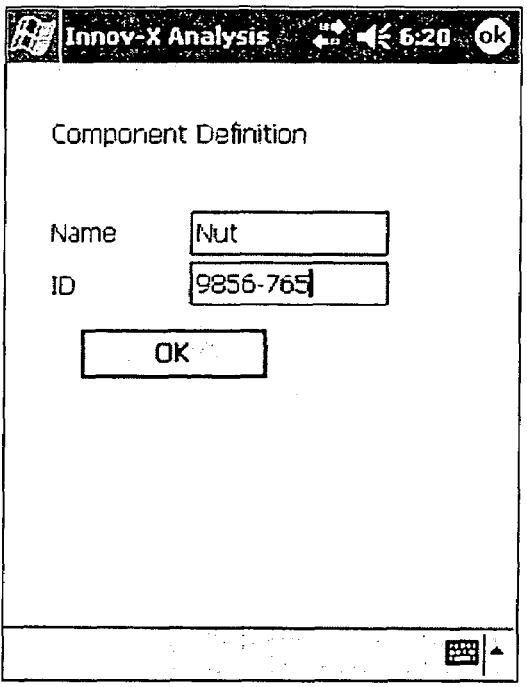

A list of components will be specified for each feature. FIGS. 11c-e illustrates the modifying of particular pre-identified components of the features.

In addition to having a user-readable name 164, these features have a unique identification string 166 related to a portion of the unique code 44 on the field load sheet. Preferably, the unique identification string 166 forms the prefix on the identification code 44. When the data logger 30 receives one of the identification codes 44, the data logger 30 reads a portion of the identification code 44 and compares the portion of the identification code 44 with the unique identification strings 166 in the component/feature library to automatically identify the type of feature 18. Depending on the size of the feature/component library, it may make sense to import the component/feature library into the data logger 30 from a spreadsheet or database file created by one of the user computers 56.

Figure 11F:
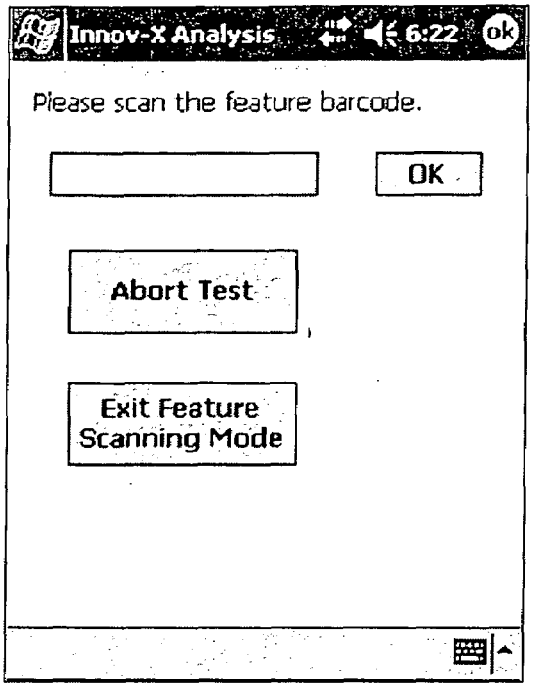
Figure 11G:
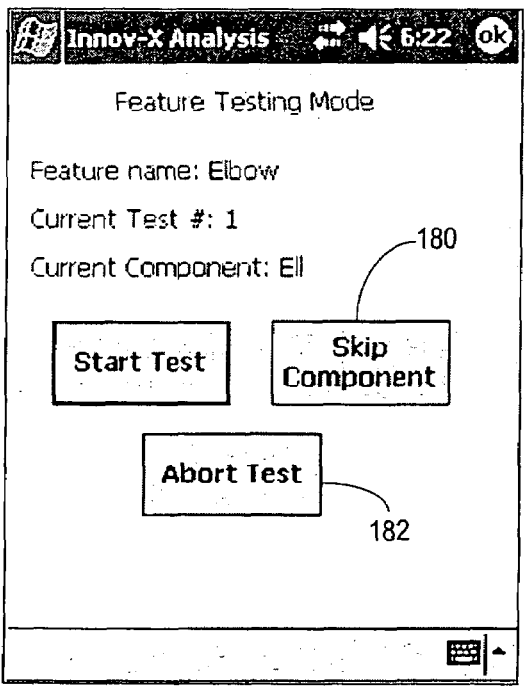
Figure 11H:
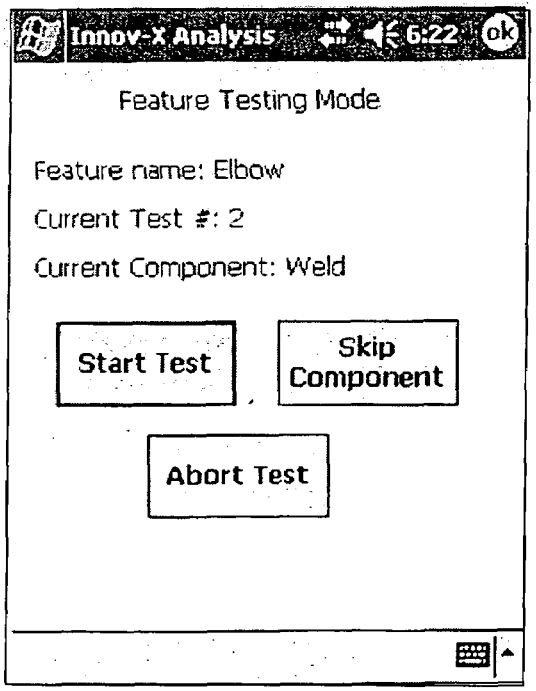

In Feature Testing Mode, when the inspector 48 initiates a test (e.g., via a trigger pull), he will be prompted to scan the feature barcode (identification code 44) as shown in FIG. 11F. The inspector will then scan the barcode (identification code 44) which contains (among other information), the type of feature to be tested. The first several characters of this barcode (identification code 44) will match the unique identification string of one feature in the database (FIG. 11G). At this point, the operator will be prompted to analyze the first component of the feature (FIG. 11G). After this test is complete, he will be prompted to analyze the next feature. (FIG. 11H) At any point, a component 14 may be skipped, or the entire feature test may be aborted by selecting the buttons "Skip component" 180 or "Abort test" 182.

Note that the amount of interaction between the inspector 48 and the data logger 30 is greatly reduced. To perform a feature test, the inspector 48

1) Pulls the instrument trigger.
2) Presses one of the buttons to initiate a barcode scan.
3) Tests each component as prompted on the screen.

The operator can perform this feature test by using just the trigger and the barcode scanning button. No information has to be selected or entered via the screen.

Tests taken in the Feature Testing Mode will have the component and feature information attached to each test, and the identification code 44 to link the information in the data logger with the component information records 42 in the positive material identification database 38. For example, the exported data file, such as a .csv file, can have the following columns: feature name, component name, component #, identification code, reading date, alloy grade ID, alloy chemistry, element structure(s) and any other test information, such as operator name or plant location (this could be specified once at the start of the session).

Reports

The inspection system 10 utilizes electronic copies of drawings that facilitate determination of locations to be tested for material composition. Preferably the electronic copies of drawings facilitate determination of all or most of the locations to be tested. This allows the inspectors, engineers and others to not only know what needs to be done, but to also measure and report on what has not been completed. Since the positive material identification database 38 is created by the process of defining all the locations, and the results are downloaded into the positive material identification database 38 in real-time, the inspection system 10 immediately knows the results of shots taken or the remaining amount of work to be done.

The inspection system 10 presents the results of retro PMI inspections on electronic inspection ISOs with color-coded results of required corrective action. These ISOs illustrate the type of discrepancy, such as Carbon steel in Chrome service, so that corrective action can be determined. Once the corrective action is determined and entered into the positive material identification database 38, a second discrepancy drawing can be generated with color-coded tags according to the corrective actions identified. These drawings can be issued to the maintenance group for corrective action, or to the inspection group for the desired monitoring.

Common drawings prepared by the positive material identification database 38 are replacement reports showing which components did not meet specification, verification reports showing which components should be re-tested, and RT/Monitor reports that show a single action of classification so that they can be given to the responsible group (shutdown planning, Inspection, etc.) for the customer.

The positive material identification database 38 can also be used for producing a Discrepancy Tag Report listing all the items and the action determined from the review of each discrepancy. This report is the basis for the corresponding summary and action or classification color-coded drawings. The RTM drawing report has no tags shown, as there are none associated with this particular drawing.

Any suitable color legend can be used which identifies useful information or groupings desired by the designer of the inspection system. The following color legends are used in the inspection system 10.

AOK=GREEN—These are items where the discrepancy was reviewed in light of the operating conditions by the area engineer, and the discrepancy was determined to be OK. These items can be considered by the customer for reclassifying the line to a lower rated specified material, so it is no longer a discrepancy.

RPL=RED—These are items that were determined by engineering review to require replacement at the next opportune time.

RTM=BLUE—These items are borderline discrepancies that are close to being within spec, so they will just be watched by the unit inspectors on a more frequent schedule.

VER=GOLD—These items are those that could not achieve accurate results due to vibration, coating issues, or paint. They are flagged for immediate verification during unit or equipment shutdown conditions.

These reports are possible as soon as the positive material identification database 38 receives an updated discrepancy spreadsheet back from the area engineer with authority to make the calls on each discrepancy item.

Furthermore, since all tagged locations 34 are identified in the positive material identification database 38 by a 'feature' tag that tells of the type of shots to be taken, the positive material identification database 38 can generate immediate 'metrics' reports. These metrics reports summarize the discrepancies found by 'feature'. The metrics reports show the number and % discrepancy of total shots taken of that 'feature' type. For example, it shows the number of discrepancy 'valves', the total number of valves shot, and the percent discrepancy of the total number shot. This same information is repeated for Welds, Pipe segments, fittings, and any other defined 'feature'.

Because all of the shot locations are directly linked to their corresponding component information records 42 in the positive material identification database 38 utilizing the identification codes 44, and the data logger 30 downloads detailed shot information, the positive material identification database 38 can provide detailed material analysis for any location desired. The positive material identification database 38 also provides the actual analyzer spectrum file, if further analysis of the shot results is needed. Further enhancements to the inspection system 10 could include a built in viewer of the raw spectrum result files for any shot.

FIGS. 12a-c illustrate exemplary reports produced utilizing the inventive inspection system 10. In particular, FIG. 12a represents an exemplary metrics report 200 illustrating the numbers and types of components from which material composition analysis data has been collected. FIG. 12b represents an exemplary discrepancy reconciliation report 202 illustrating the specifications for the components and the readings from the data logger 30. The discrepancy reconciliation report 202 can also include fields or columns, not shown, for maintenance recommendations. Thus, the engineer's maintenance recommendations can be included within the report and sorted, by such recommendations if desired. FIG. 12c represents a product material identification discrepancy report 210 illustrating the values of the different types of material composition analysis data collected. The reports can be provided as a spread sheet, or printed to make a hard copy.

Figure 13:
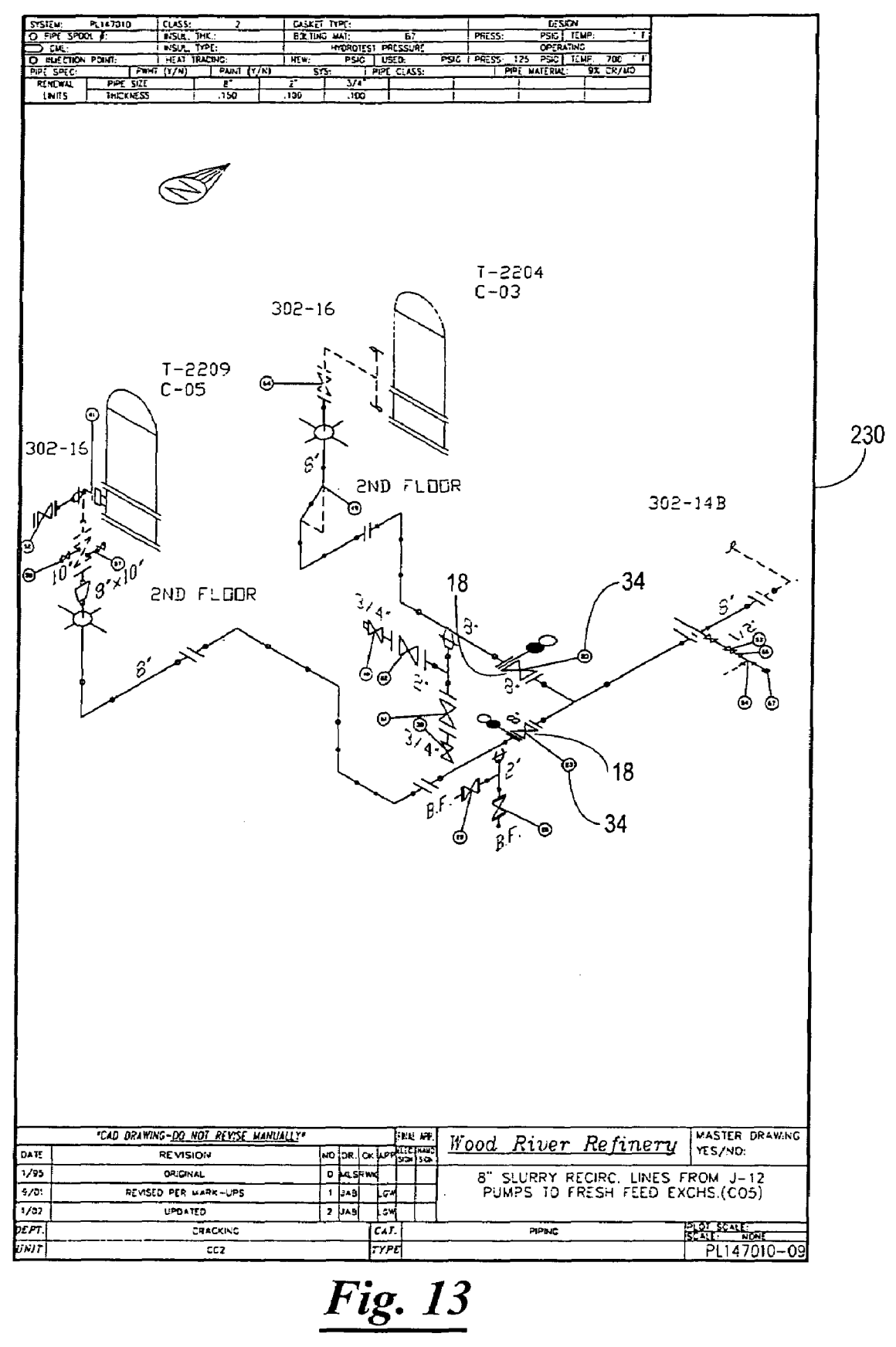

FIG. 13 illustrates an exemplary print off (or representation) of an electronic drawing constructed and produced in accordance with the present invention. More particularly, FIG. 13 represents a summary report 230 showing tagged locations 34, as well as various components 14 and features 18 of the system 22. Only a few of the tagged locations 34, components 14 and features 18 have been labeled to prevent FIG. 13 from becoming cluttered. As discussed above, the colors of the tagged locations 34, the components 14 and/or the features 18 can be varied to indicate the classification of the components 14 and/or features 18 identified in the report 230.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An inspection system for performing positive material identification of components of a multi-feature system, the inspection system comprising:

an electronic drawing having tagged locations identifying respective features of the multi-feature system to be read for retro positive material identification analysis, the electronic drawing having at least one unique identification code for each tagged location;

a positive material identification (PMI) database having a component information records for respective components, each component information record correlated to a component associated with one tagged location of the electronic drawing;

a field load sheet having identification codes for respective tagged locations, the identification codes of the field load sheet correlated to the component information records of the positive material identification database; and a data logger receiving identification codes for respective tagged locations from the field load sheet, and also collecting material composition analysis data, the data logger communicating the identification codes and the collected material composition analysis data to the positive material identification database for populating the component information records of the positive material identification database with the material composition analysis data.

2. The inspection system of claim 1, wherein the PMI database contains two or more records associated with one of the features.

* * * * *

UNITED STATES PATENT AND TRADEMARK OFFICE
CERTIFICATE OF CORRECTION

PATENT NO. : 7,596,419 B2
APPLICATION NO. : 11/282739
DATED : September 29, 2009
INVENTOR(S) : Fiore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this

Fourteenth Day of December, 2010

David J. Kappos
*Director of the United States Patent and Trademark Office*